US012769485B2

(12) United States Patent
Shimonomura et al.

(10) Patent No.: US 12,769,485 B2
(45) Date of Patent: Oct. 20, 2026

(54) MEMORY SYSTEM

(71) Applicant: Kioxia Corporation, Tokyo (JP)

(72) Inventors: Sho Shimonomura, Tokyo (JP); Hideaki Shirashouji, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/078,391

(22) Filed: Mar. 13, 2025

(65) Prior Publication Data

US 2026/0064316 A1 Mar. 5, 2026

(30) Foreign Application Priority Data

Sep. 5, 2024 (JP) ................................ 2024-153247

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 8,595,438 | B1 * | 11/2013 | Clark | G06F 11/3409 711/119 |
| 2009/0204746 | A1 * | 8/2009 | Chen | G06F 12/0246 711/E12.001 |
| 2015/0019801 | A1 | 1/2015 | Yoon et al. | |
| 2020/0401341 | A1 | 12/2020 | Muthiah | |
| 2022/0043604 | A1 | 2/2022 | Kurita et al. | |
| 2022/0057956 | A1 | 2/2022 | Liang et al. | |

FOREIGN PATENT DOCUMENTS

JP 2022030146 A 2/2022

* cited by examiner

*Primary Examiner* — Jae U Yu
(74) *Attorney, Agent, or Firm* — Maier & Maier, PLLC

(57) ABSTRACT

According to one embodiment, a memory system includes a nonvolatile memory and a controller. The controller is connectable to a host, and is configured to control the nonvolatile memory. The controller is configured to write data to the nonvolatile memory using a plurality of write types with different data write speeds based on information provided by the host, and determine a write ratio of the plurality of the write types.

24 Claims, 20 Drawing Sheets

MEMORY SYSTEM

CROSS-REFERENCE TO RELATED APPLICATIONS

This application is based upon and claims the benefit of priority from Japanese Patent Application No. 2024-153247, filed Sep. 5, 2024, the entire contents of which are incorporated herein by reference.

FIELD

Embodiments described herein relate generally to a memory system.

BACKGROUND

In general, a NAND flash memory supports a plurality of types of writing. For example, the NAND flash memory which supports triple level cell (TLC) supports writing data using single level cell (SLC) as well as writing data using TLC.

Writing with TLC can store more data than writing with SLC. In contrast, the speed of writing data with TLC is slower than the speed of writing data with SLC. Thus, writing to the NAND flash memory has a trade-off relationship between the amount of data written and the speed of writing, depending on the type of writing.

In addition, there is also a difference between the Foggy-Fine method and the Full Sequence method for writing the same number of bits of data to a single memory cell. In the Foggy-Fine method, the same data is written to the memory cell through a plurality of write operations. In the Full Sequence method, data is written to the memory cell in a single write operation. In the Foggy-Fine method, the write speed is slower than that of the Full Sequence method, and the amount of data written is greater. The amount of data written to a single memory cell in the Foggy-Fine method is the same as the amount of data written in the Full Sequence method. However, since a plurality of write operations are executed, the amount of writing in the Foggy-Fine method is greater than that in the Full Sequence method.

In addition, high write speeds are not required during the use of the storage device in some cases. For example, when the storage device downloads data to be written from the network, the communication speed of the network may be excessively slower than the write speed of the storage device. At this time, the write speed of the storage device is excessively fast.

One of methods of improving the write speed of the NAND flash memory is a mechanism referred to as SLC buffer. This mechanism temporarily improves the write speed by writing data with SLC instead of writing data with write types of a slow write speed such as TLC. The data temporarily written to the SLC buffer needs to be written back with write types with a larger capacity of data stored per memory cell such as TLC during the idle time of the storage device, and the like.

At this time, the write speed of the storage device to the SLC buffer may be excessively faster than the communication speed when receiving write data from the host device. At this time, the write speed of the storage device is excessively fast.

In addition, when writing the amount of data larger than free space of the SLC buffer, it is necessary to rewrite the data in the SLC buffer to a normal storage area in order to create free space more than or equal to the short capacity. For this reason, the write time for writing a large amount of data is longer than the write time for writing data with a smaller amount than the free space of the SLC buffer. In addition, the write time for writing a large amount of data is longer than that for writing data to a normal storage area using TLC. Thus, if writing continues in a situation in which the capacity of the SLC buffer is less than the data to be written, the write speed may be slower and the write time may be longer than that of writing using only the normal storage area.

Furthermore, the NAND flash memory has a write cycle life. The write cycle life is the period of time until the number of times of rewriting data reaches an upper limit value. For this reason, the use of the SLC buffer, which increase the amount of data written, shortens the life of the NAND flash memory. One of indicators of the life of the NAND flash memory is referred to as Write Amplification Factor (WAF). This is an amplification ratio indicating how much data is actually written in the NAND flash memory in comparison with the amount of data which is instructed to be written from the host device.

The data written to the SLC buffer is migrated and written to the normal storage area. At this time, the data is written in accordance with the number of bits of memory per memory cell in the destination. In consideration of this, the WAF in a case of writing the data from the host device to the SLC buffer and then migrating the data to the normal storage area where TLC is applied is 4. For example, when writing 3 GiB of data to the normal storage area of TLC having the block size of 3 GiB via the SLC buffer, the data is first written to three blocks of the SLC buffer. After that, the data is rewritten to one block of the normal storage area. Therefore, write of a total of four blocks occurs.

DETAILED DESCRIPTION

In general, according to one embodiment, a memory system includes a nonvolatile memory and a controller. The controller is connectable to a host, and is configured to control the nonvolatile memory. The controller is configured to write data to the nonvolatile memory using a plurality of write types with different data write speeds based on information provided by the host, and determine a write ratio of the plurality of the write types.

Embodiments will be described hereinafter with reference to the accompanying drawings.

First Embodiment

First, a first embodiment will be described.

Figure 1:
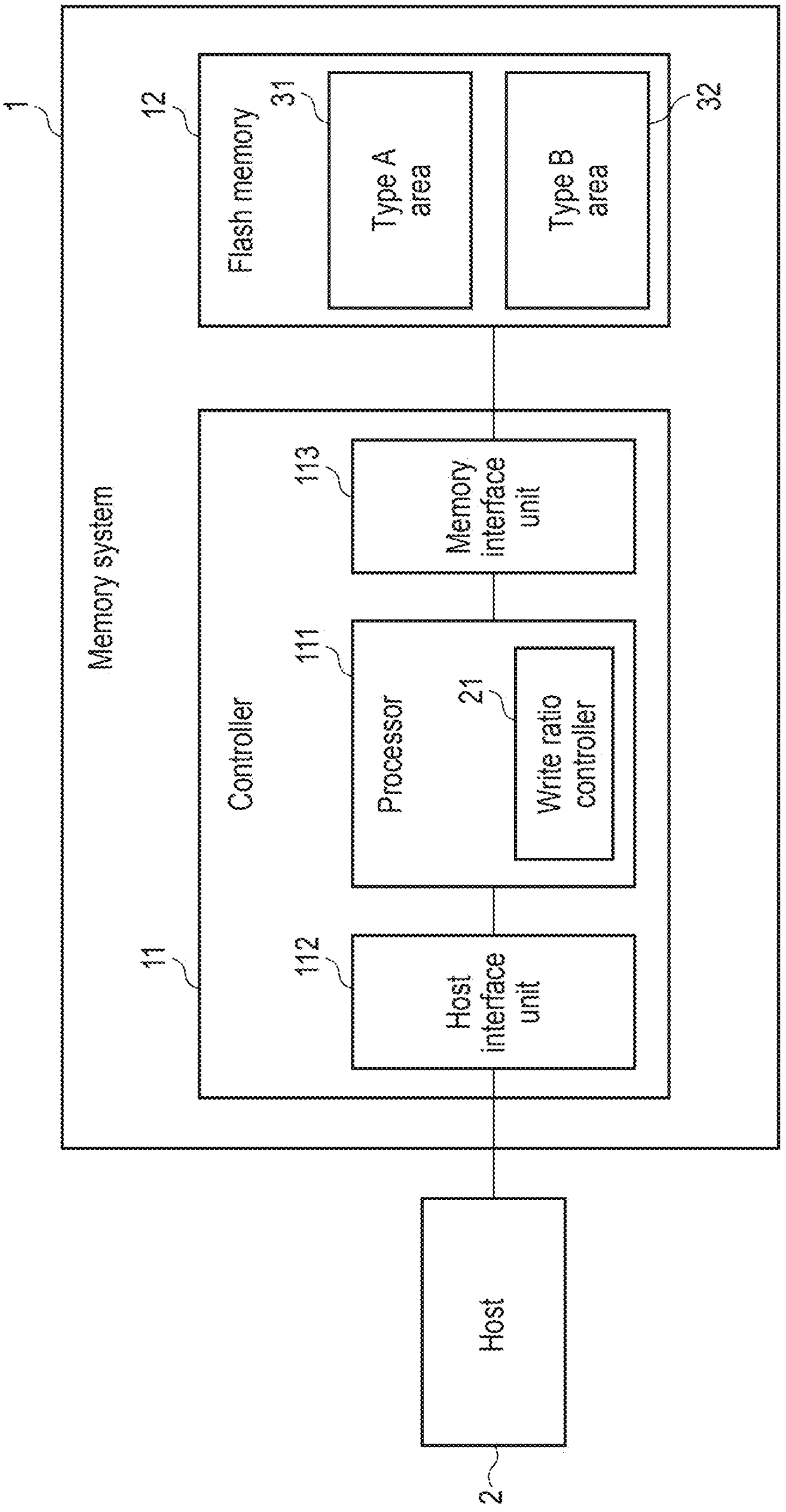
FIG. 1 is a view showing an example of a configuration of a memory system of a first embodiment.

FIG. 1 is a view showing an example of a configuration of a memory system 1 of the first embodiment. FIG. 1 also shows a configuration example of an information processing system including a memory system 1 and a host 2 connected to the memory system 1. The host 2 is an information processing apparatus such as a server or a personal computer.

The memory system 1 includes a controller 11 and a flash memory 12. The flash memory 12 is a NAND flash memory which supports a plurality of write types.

An example in which the flash memory 12 supports two write types will be described here. A faster write type such as SLC is referred to as type A, and a slower write type such as TLC is referred to as type B. The type A area 31 shown in FIG. 1 indicates a concept of an area where data is written using the type A write type, and the type B area 32 indicates a concept of an area where data is written using the type B write type.

Incidentally, the flash memory 12 may support three or more write types as well as two write types. In addition, the combination of write types between type A and type B is not limited to the combination of SLC and TLC, but may be a combination of any two types of SLC, multi-level cell (MLC), TLC, quadruple level cell (QLC), penta level cell (PLC), and the like. In other words, various storage devices can be applied as the memory system 1, as long as the storage devices use as a primary receiving buffer, in addition to an area where writing is executed with a first number of storage bits multivalued per memory cell, an area where writing is executed with a secondary number of storage bits per memory cell that is less than the first number of storage bits per memory cell for the purpose of optimizing the write speed. The primary receiving buffer is a storage area with a faster write speed than the storage area where data is to be written, and is provided for the purpose of temporarily storing the data.

Furthermore, the combination of the write types of type A and type B may be such that both of the write types have the same number of memory bits per memory cell, and that one of the write types is the write using the Fuzzy-Fine method and the other is the write using the Full Sequence method. In other words, a storage device using the write in the Full Sequence method in addition to the write in the Foggy-Fine method as a primary receiving buffer can also be used as the memory system 1.

In other words, various storage devices that support a plurality of write types with different speeds can be applied as the memory system 1 of the first embodiment.

The controller 11 is a device which executes writing data to the flash memory 12 and reading data from the flash memory 12 in response to commands from the host 2. The controller 11 can also set the operation of the memory system 1 in response to commands from the host 2. The controller 11 is realized as, for example, a system on a chip (SoC).

The controller 11 includes a processor 111, a host interface unit 112, and a memory interface unit 113.

The processor 111 executes the various processes that the controller 11 is to execute by executing programs such as firmware. The various processes that the controller 11 is to execute include the above-described writing of data to the flash memory 12, reading of data from the flash memory 12, operation settings of the operation of the memory system 1, and the like. In addition, a write ratio controller 21 is provided as one of the processing units realized by the processor 111 executing the firmware. The write ratio controller 21 is a module that controls the write ratio of the write types of type A and type B for the flash memory 12, based on the information provided by the host 2.

In this case, an example in which the various processes to be executed by the controller 11 are realized by the processor 111 executing the firmware is disclosed, but the processes may also be realized by dedicated hardware built in the controller 11, such as an electrical circuit.

The host interface unit 112 controls communication conforming to predetermined communication standards with the host 2. The memory interface unit 113 controls writing data to the flash memory 12 and reading data from the flash memory 12.

When a parameter specifying a performance level is added to the write command received from the host 2, the memory system 1 of the first embodiment configured as described above executes writing to the flash memory 12 by mixing the write type of type A and the write type of type B in the ratio corresponding to the performance level. In other words, the memory system 1 of the first embodiment enables the host 2 to specify the performance level when the host 2 issues the write command. The performance level is a value which indicates the write speed required of the memory system 1, for example, at a certain level among a predetermined number of levels. For example, this parameter may be added using one of parameter groups prepared in advance for the write command. The parameter group can be optionally defined by the vendor for any purpose. The ratio of the write types according to the performance level specified by the host 2 is controlled by the write ratio controller 21.

In the memory system 1 of the first embodiment, the write ratio of the write type according to each performance level is set in advance at the time of shipment. The write ratio is stored in the write ratio controller 21. When receiving a write command from the host 2, the controller 11 determines whether or not the parameter indicating the performance level is added to the write command. If the parameter indicating the performance level is added to the write command, the write controller 21 references the write ratio corresponding to the performance level from a volatile memory. The controller 11 executes writing to the flash memory 12 using the ratio referenced by the write ratio controller 21. Incidentally, if the parameter indicating the performance level is not added to the write command, the controller 11 executes writing to the flash memory 12 using the specified write type.

In the memory system 1 of the first embodiment, the write ratio between the write type of type A and the write type of type B is set in advance for each of the performance levels that can be specified by the host 2. The write ratio between the write type of type A and the write type of type B, which corresponds to each performance level needs to be determined based on the average write speed in a case where writing to the flash memory 12 is executed while mixing the write type of type A and the write type of type B. A method of calculating the average write speed in a case where writing to the flash memory 12 is executed while mixing the write type of type A and the write type of type B, which is attempted when, for example, designing the memory system 1, will be described here.

It is assumed that, for example, the write ratio is set to type A:type B=2:1 for a certain performance level k. In this case, the controller 11 controls writing to the flash memory 12 such that ⅔ of the amount of data written by the write command are written using the write type of type A and ⅓ is written using the write type of type B. The amount of data to be written is represented by L, the write speed for type A is represented by $v_a$, the write speed for type B is represented by $v_b$, and write proportions to each write type are represented by α and β. The write speed v at this time is expressed as follows.

$$v = \frac{L}{\frac{L\alpha}{v_a} + \frac{L\beta}{v_b}} = \frac{v_a v_b}{\alpha v_b + \beta v_a} \quad \text{[Equation 1]}$$

In other words, the average write speed can be adjusted by changing α and β.

The values α and β, which represent the proportions, have relationships α+β=1 and β=1−α. In addition, each of α and β is the number greater than or equal to 0 and less than or equal to 1. By substituting this for the upper equation, the average write speed can be calculated with the following equation.

$$v = \frac{v_a v_b}{\alpha v_b + (1-\alpha) v_a} = \frac{v_a v_b}{(1-\beta) v_b + \beta v_a} \quad \text{[Equation 2]}$$

In the memory system 1, the write ratio between the write type of type A and the write type of type B, which corresponds to each performance level is set based on the average write speed calculated as described above.

The controller 11 writes data to the flash memory 12 by mixing the write type of type A and the write type of type B in the set ratio. At this time, it is desirable that writing using the write type of type A and writing using the write type of type B are executed based on the size at which the flash memory 12 manages the area of the flash memory 12.

For example, in a case of writing 9 MiB of data, when the size managed by the controller 11 is 1 MiB and the write ratio is set to SLC buffer:normal storage (TLC)=2:1, the first 2 MiB of data is written to the SLC buffer. The next 1 MiB of data is written to the normal storage. The further next 2 MiB of data is written to the SLC buffer. Finally, 9 MiB of data is alternately written in each of write types. In other words, the size of the area of flash memory 12 managed by the controller 11 is the minimum unit at which controller 11 changes the write type. Thus, data is alternately written to the area of the flash memory 12 corresponding to each write type.

In addition, when writing to the flash memory 12 by mixing the write type of type A and the write type of type B, the memory system 1 writes data to the flash memory 12 via the cache memory of the controller 11. At this time, the controller 11 alternately writes data of a size corresponding to the size of the cache memory to the area of the flash memory 12, which corresponds to each writing type. If the cache memory size is small, the controller 11 alternately writes data of a small size. If data of a small size is written alternately, data management in the controller 11 may be complicated. By increasing the cache memory of the controller 11, the controller 11 can write data in a more ideal average write speed. The cache memory of the controller 11 may be built in the controller 11 as static RAM [random access memory] (SRAM) or the like or may be provided outside the controller 11 as dynamic RAM (DRAM) or the like. However, if the cache memory increase, the cost of the memory system 1 also increases. The appropriate size of the cache memory therefore needs to be set.

In the first embodiment, the host 2 cannot calculate the average write speed of the memory system 1 from the performance level. For this reason, the host 2 estimates the average write speed from the previous operation results of the memory system 1. And the host 2 specifies the performance level. Alternatively, the host 2 may specify the performance level by setting the average write speed of the memory system 1 as design information when designing the host 2.

Next, WAF in a case where the primary receiving buffer has a sufficient free space when the memory system 1 of the first embodiment has an area of the flash memory 12 corresponding to the write type of type A as the primary receiving buffer, in comparison with the write type of type B, will be described.

WAF in a case where the data is written not using the write ratio but using the primary receiving buffer and the data is finally migrated to normal storage is represented by $w_a$. WAF in a case where the data is written using the write ratio and is finally migrated to normal storage is represented by w. If the write speed of the primary receiving buffer is substituted for the write speed $V_a$ of type A and the write speed of the normal storage is substituted for the write speed $V_b$ of type B in [Equation 1], WAFw in the case of using the write ratio can be calculated in the following manner using the symbols in [Equation 1]

$$\begin{aligned} w &= \frac{\alpha w_a L + \beta L}{L} \\ &= \alpha w_a + \beta \\ &= \alpha(w_a - 1) + 1 \end{aligned} \quad \text{[Equation 3]}$$

If w is subtracted from $w_a$, the following is obtained.

$$\begin{aligned} w_a - w = w_a - \alpha(w_a - 1) - 1 \\ &= -(\alpha - 1)(w_a - 1) \\ &= (1 - \alpha)(w_a - 1) \end{aligned} \quad \text{[Equation 4]}$$

$w_a \geq w$, where $1 \geq \alpha \geq 0$ and $w_a \geq 1$. $WAF_w$ in the case of using the write ratio is less than $WAFw_a$ in the case of not using the write ratio.

Figure 2:
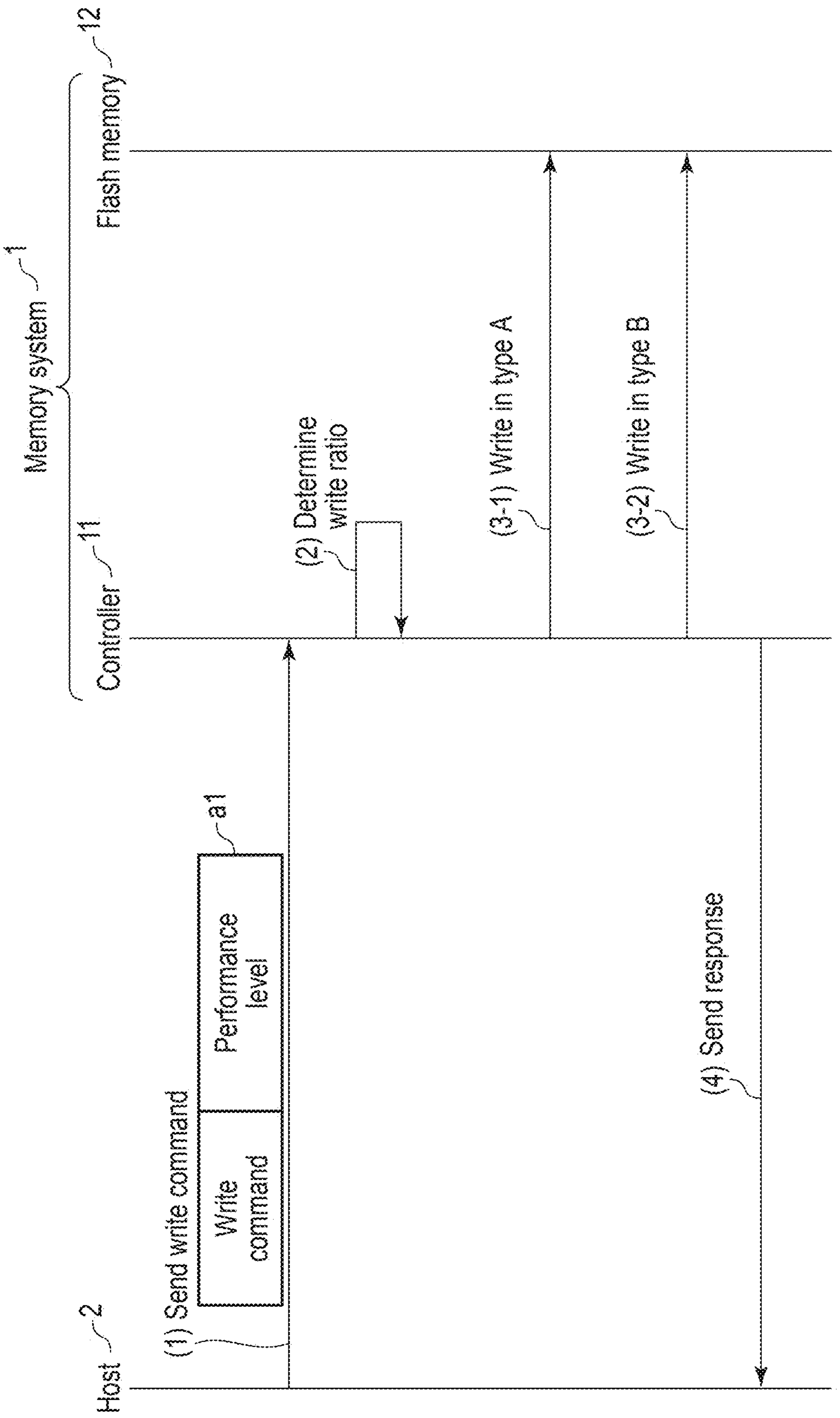
FIG. 2 is a sequence chart showing a flow of operations related to data write in an information processing system including the memory system of the first embodiment.

FIG. 2 is a sequence chart showing the operation procedure related to data write in the information processing system including the memory system 1 of the first embodiment.

The host 2 sends a write command to which parameter al specifying the performance level is added to the memory system 1 (1). When receiving the write command to which parameter al specifying the performance level is added, the controller 11 of the memory system 1 determines the write ratio between the write type of type A and the write type of type B, based on the specified performance level (2).

The controller 11 of the memory system 1 executes writing the data to the flash memory 12 in the write type of type A (3-1) and writing the data to the flash memory 12 in the write type of type B (3-2), based on the determined write ratio. When writing to the flash memory 12 is completed, the controller 11 of the memory system 1 sends a response to the write command to the host 2 (4).

Figure 3:
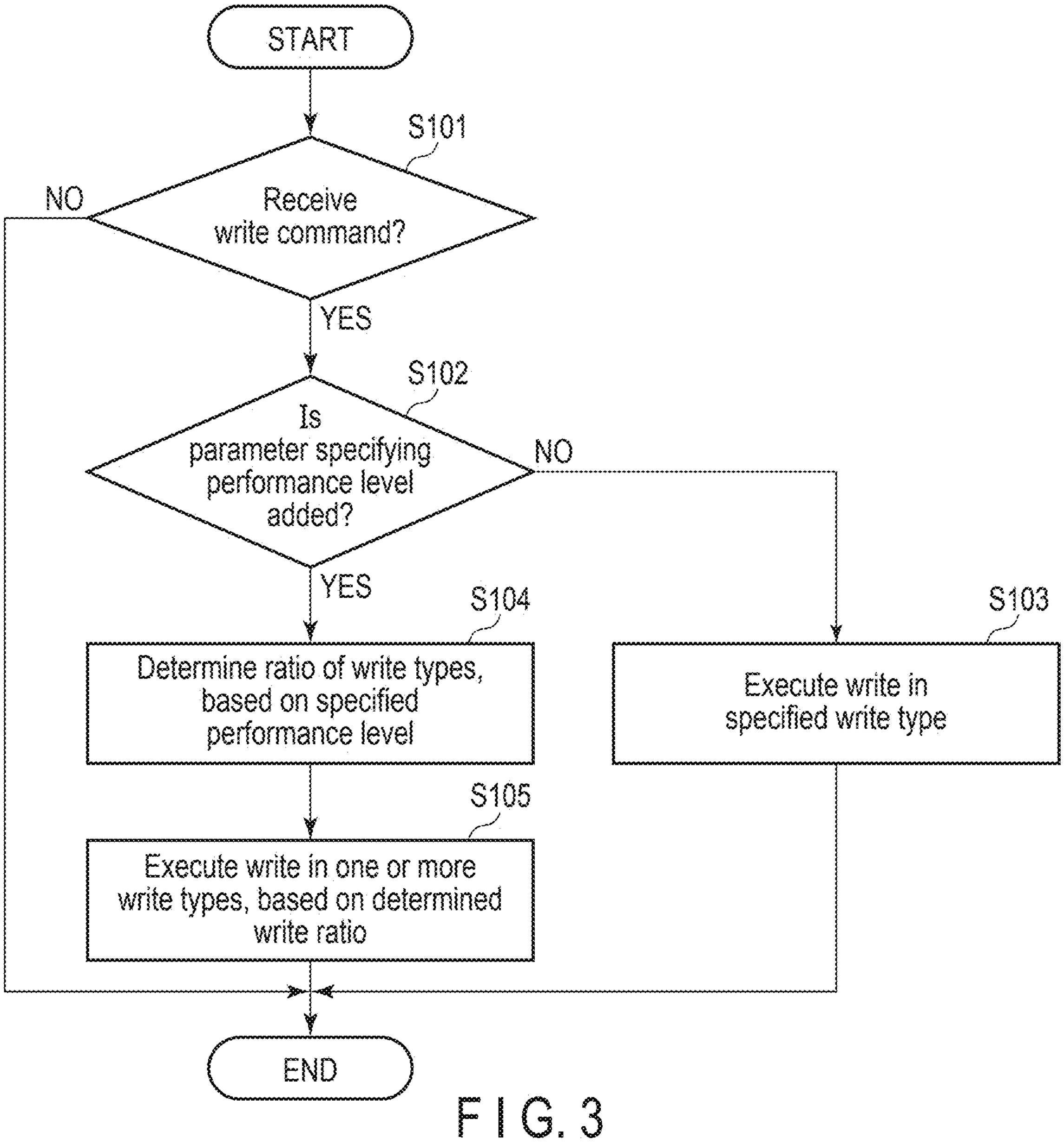
FIG. 3 is a flowchart showing the flow of operations when receiving a write command of the memory system of the first embodiment.

FIG. 3 is a flowchart showing the operation flow of the memory system 1 of the first embodiment upon reception of the write command.

The controller 11 determines whether or not the write command is received from the host 2 (S101). If the write command is not received (S101: NO), the controller 11 ends the operation related to the reception of the write command. If the write command is received (S101: YES), the controller 11 determines whether or not the parameter specifying the performance level is added to the write command (S102).

If the parameter specifying the performance level is not added to the write command (S102: NO), the controller 11 executes writing to the flash memory 12 with the specified write type (S103). The specified write type may be a predetermined single write type or may be a plurality of write types with predetermined write ratios.

In contrast, if the parameter specifying the performance level is added to the write command (S102: YES), the controller 11 determines the ratio of the write types based on the specified performance level (S104). The determined ratio of the write types may imply a case where the ratio of a certain write type is 100%.

The controller 11 executes writing to the flash memory 12 in one or more writes types, based on the determined write ratio (S105).

As described above, in the memory system 1 of the first embodiment, writing with the write type of a low capacity is suppressed by writing at a write ratio which sufficiently satisfies the performance level specified by the host 2. As a result, migration processing from the low-capacity write type to the high-capacity write type is suppressed during writing, and the final write completion time is reduced. In addition, since the amount of write is reduced by suppressing the migration processing, the number of times of rewriting to the flash memory 12 is reduced, and the life can be improved.

Moreover, the memory system 1 of the first embodiment optimizes the write speed by writing at a write ratio which sufficiently satisfies the performance level specified by the host 2. Therefore, for example, excessiveness in write speed for the requirements from the host 2 can be prevented.

Second Embodiment

Next, a second embodiment will be described. It is assumed that a memory system 1 of the second embodiment has the same configuration as the memory system 1 of the first embodiment. The same constituent elements as those of the memory system 1 of the first embodiment are denoted by the same reference numerals and their descriptions are omitted.

In the second embodiment, unlike the first embodiment, a parameter specifying the performance level is not added to the write command. The memory system 1 of the second embodiment operates based on a performance level specified in advance for all received write commands.

The memory system 1 of the second embodiment is the same as the memory system 1 of the first embodiment with respect to write control. The memory system 1 of the second embodiment executes writing with one or more write types at a write ratio corresponding to the performance level specified in advance.

In the memory system 1 of the second embodiment, similarly to the memory system 1 of the first embodiment, various storage devices using as a primary receiving buffer, in addition to an area where writing is executed with a first number of storage bits multivalued per memory cell, such as MLC, TLC, QLC, or PLC, as the write types, an area where writing is executed with a secondary number of storage bits per memory cell that is less than the first number of storage bits, such as SLC, MLC, TLC, or QLC, can be applied. The combination of the number of storage bits per memory cell is not limited. Furthermore, even when the number of storage bits per memory cell is the same, a storage device using a plurality of write types with a difference in speed, such as a storage device that uses both the Foggy-Fine method and the Full Sequence method, can also be applied as the memory system 1 of the second embodiment.

Figure 4:
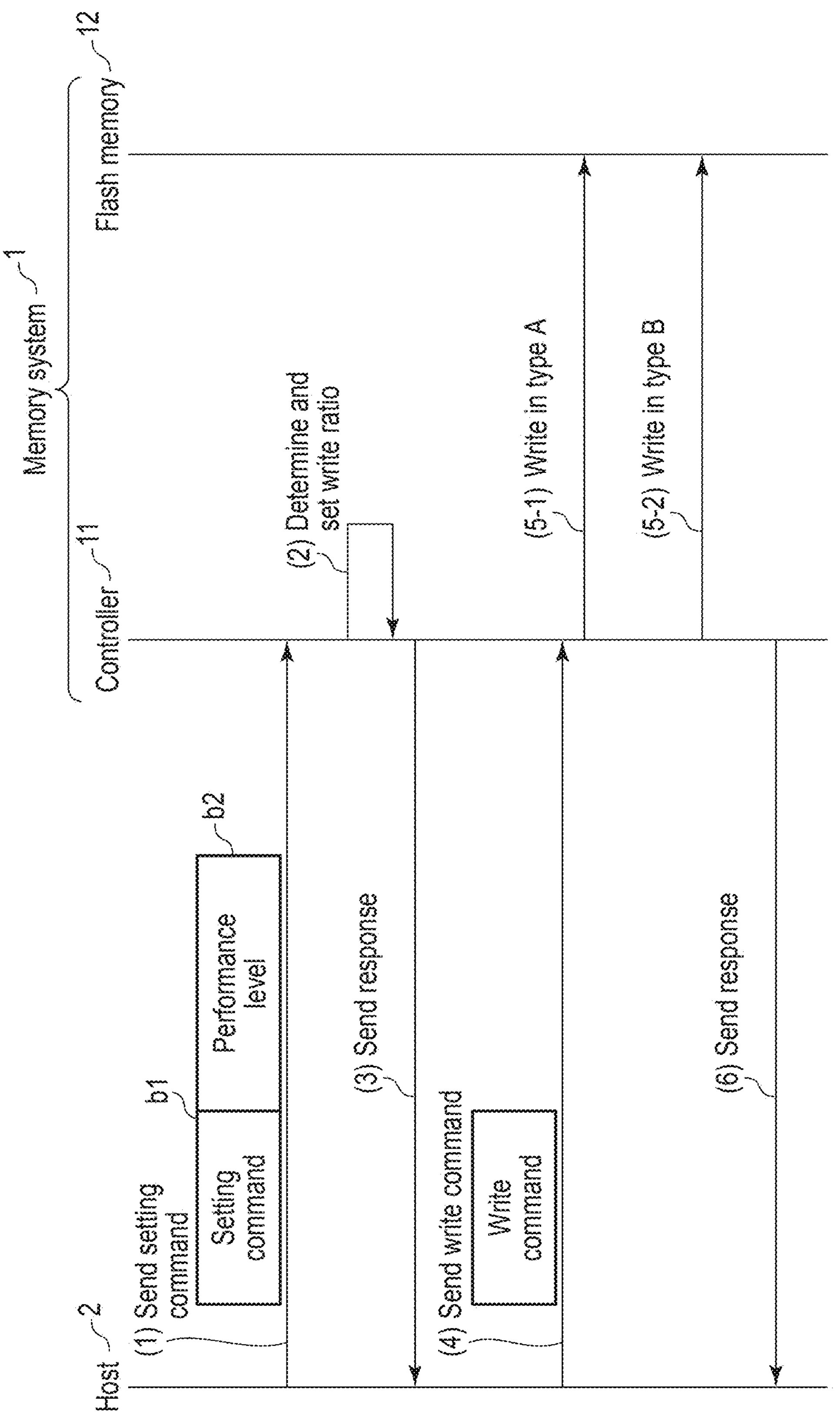
FIG. 4 is a sequence chart showing a flow of operations related to data write in an information processing system including a memory system of a second embodiment.

FIG. 4 is a sequence chart showing the operation procedure related to data write in the information processing system including the memory system 1 of the second embodiment.

Prior to sending a write command to the memory system 1, the host 2 sends a setting command b1 to which a parameter b2 specifying the performance level is added, to the memory system 1 (1). When receiving the setting command b1 to which parameter b2 specifying the performance level is added, the controller 11 of the memory system 1 determines and sets the write ratio between the write type of type A and the write type of type B, based on the specified performance level (2). When setting the write ratio is completed, the controller 11 of memory system 1 sends a response to the setting command to the host 2 (3).

After sending the setting command b1 to the memory system 1, the host 2 sends a write command to the memory system 1 (4). A parameter specifying the performance level is not added to the write command.

When receiving the write command, the controller 11 of the memory system 1 executes writing the data to the flash memory 12 in the write type of type A (5-1) and writing the data to the flash memory 12 in the write type of type B (5-2), based on the write ratio which is set when receiving the setting command b1. When writing the data to the flash memory 12 is completed, the controller 11 of memory system 1 sends a response to the write command to the host 2 (6).

Figure 5:
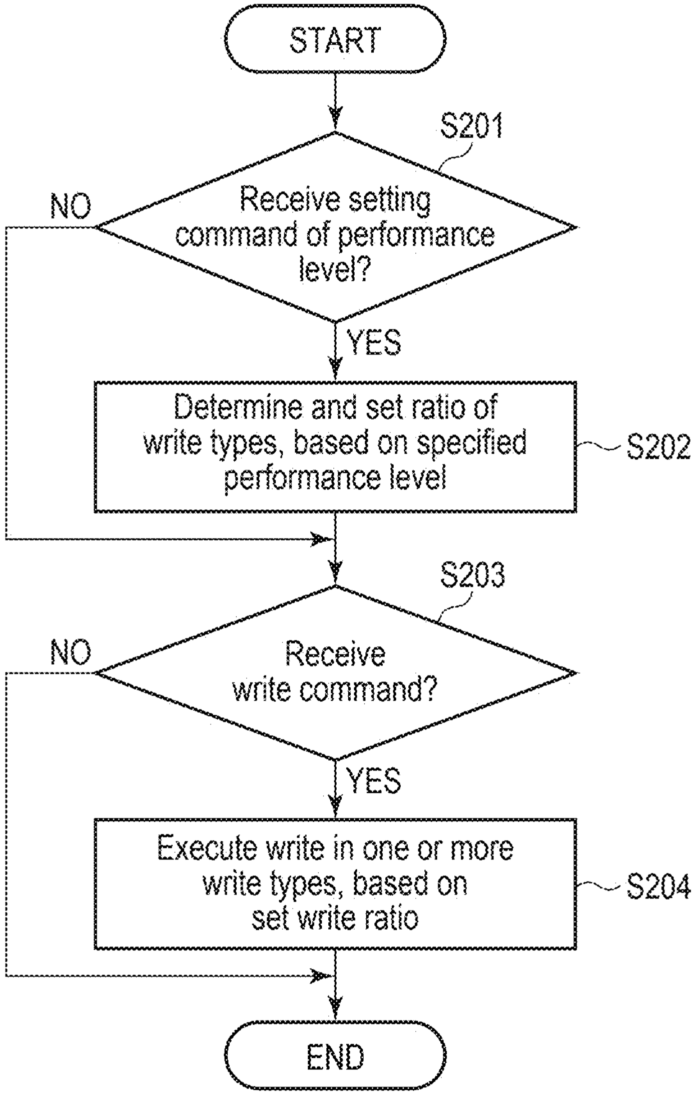
FIG. 5 is a flowchart showing the flow of operations when receiving a write command of the memory system of the second embodiment.

FIG. 5 is a flowchart showing the operation flow of the memory system 1 of the second embodiment upon reception of the write command.

The controller 11 determines whether or not the setting command of the performance level is received from the host 2 (S201). If the setting command is received (S201: YES), the controller 11 determines and sets the ratio of the write types, based on the specified performance level (S202). If the setting command is not received (S201: NO), the controller 11 skips the process in S202.

Next, the controller 11 determines whether or not the write command is received from the host 2 (S203). If the write command is received (S203: YES), the controller 11 executes writing the data to the flash memory 12 in one or more write types, based on the set write ratio (S204). If the write command is not received (S203: NO), the controller 11 ends the operation related to the reception of the write command.

As described above, in the memory system 1 of the second embodiment, the processing related to the write ratio for each write command is reduced by specifying the performance level in advance. Therefore, the write speed can be optimized.

Third Embodiment

Next, a third embodiment will be described. It is assumed that a memory system 1 of the third embodiment has the same configuration as the memory system 1 of the first embodiment. The same constituent elements as those of the memory system 1 of the first embodiment are denoted by the same reference numerals and their descriptions are omitted.

In the third embodiment, a parameter specifying the ratio of the write types is added to the write command instead of the performance level in the first embodiment.

The host 2 adds a parameter specifying a write ratio to the write command. A controller 11 of the memory system 1 writes received data to a flash memory 12 in each write type at a specified write ratio.

In other words, in the third embodiment, the host 2 directly specifies the write ratio for each write type for each write command. By directly specifying the write ratio, the host 2 can explicitly control the usage status of the flash memory 12.

For example, writing using SLC consumes the capacity of the flash memory 12 that is three times as great as in writing using TLC. In the third embodiment, by enabling the host 2 to recognize this physical capacity consumption, it is possible to execute writing while considering the degradation in performance of the memory system 1. Similarly to the first embodiment, the combination of write types is not limited to the combination of SLC and TLC, but various combinations of write types can be applied.

Figure 6:
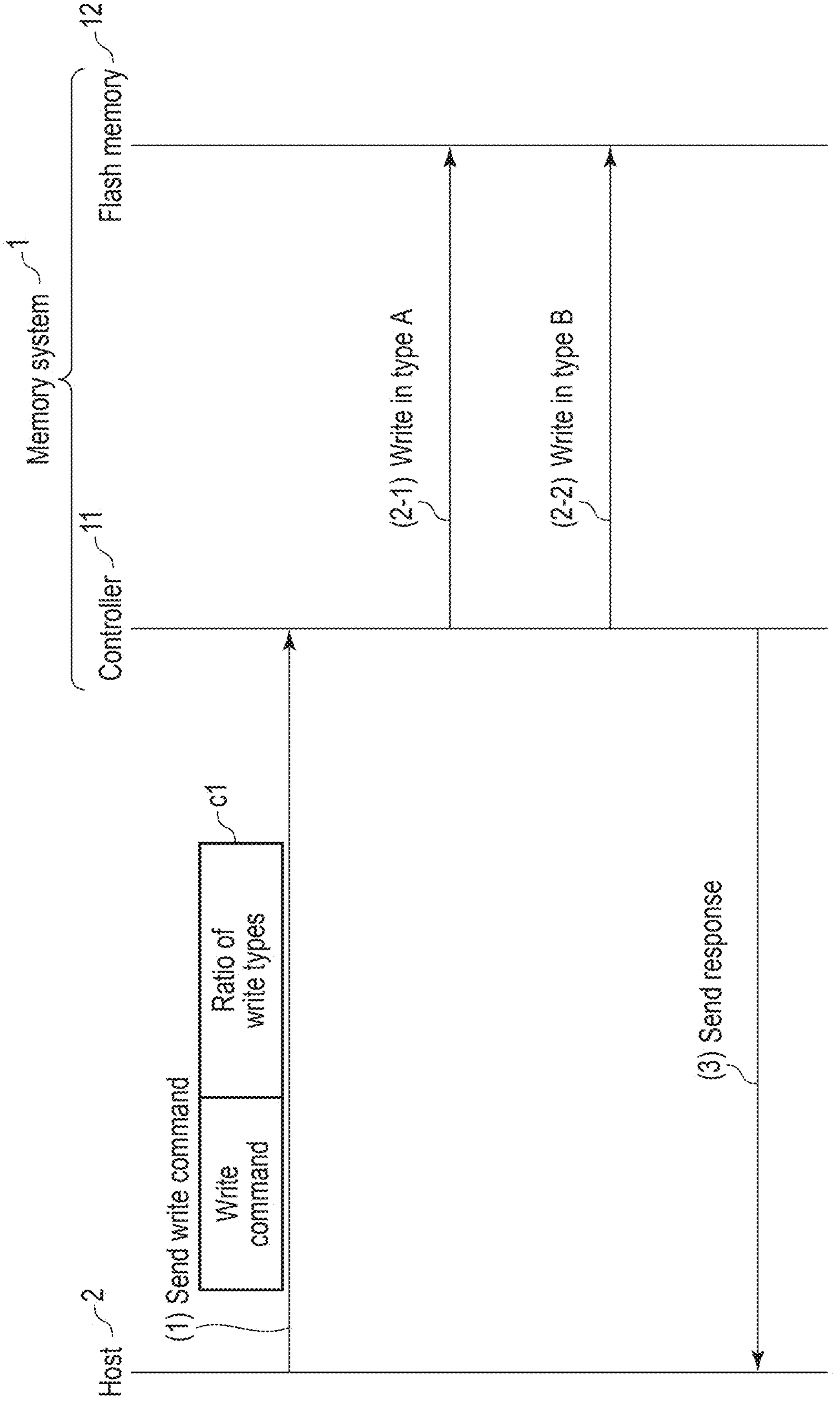
FIG. 6 is a sequence chart showing a flow of operations related to data write in an information processing system including a memory system of a third embodiment.

FIG. 6 is a sequence chart showing the operation procedure related to data write in the information processing system including the memory system 1 of the third embodiment.

The host 2 sends a write command to which parameter c1 specifying the ratio of the write types is added to the memory system 1 (1). When receiving the write command to which the parameter c1 specifying the ratio of the write types is added, the controller 11 of the memory system 1 executes writing the data to the flash memory 12 in the write type of type A (2-1) and writing the data to the flash memory 12 in the write type of type B (2-2), based on the specified write ratio.

When writing the data to the flash memory 12 is completed, the controller 11 of memory system 1 sends a response to the write command to the host 2 (3).

Figure 7:
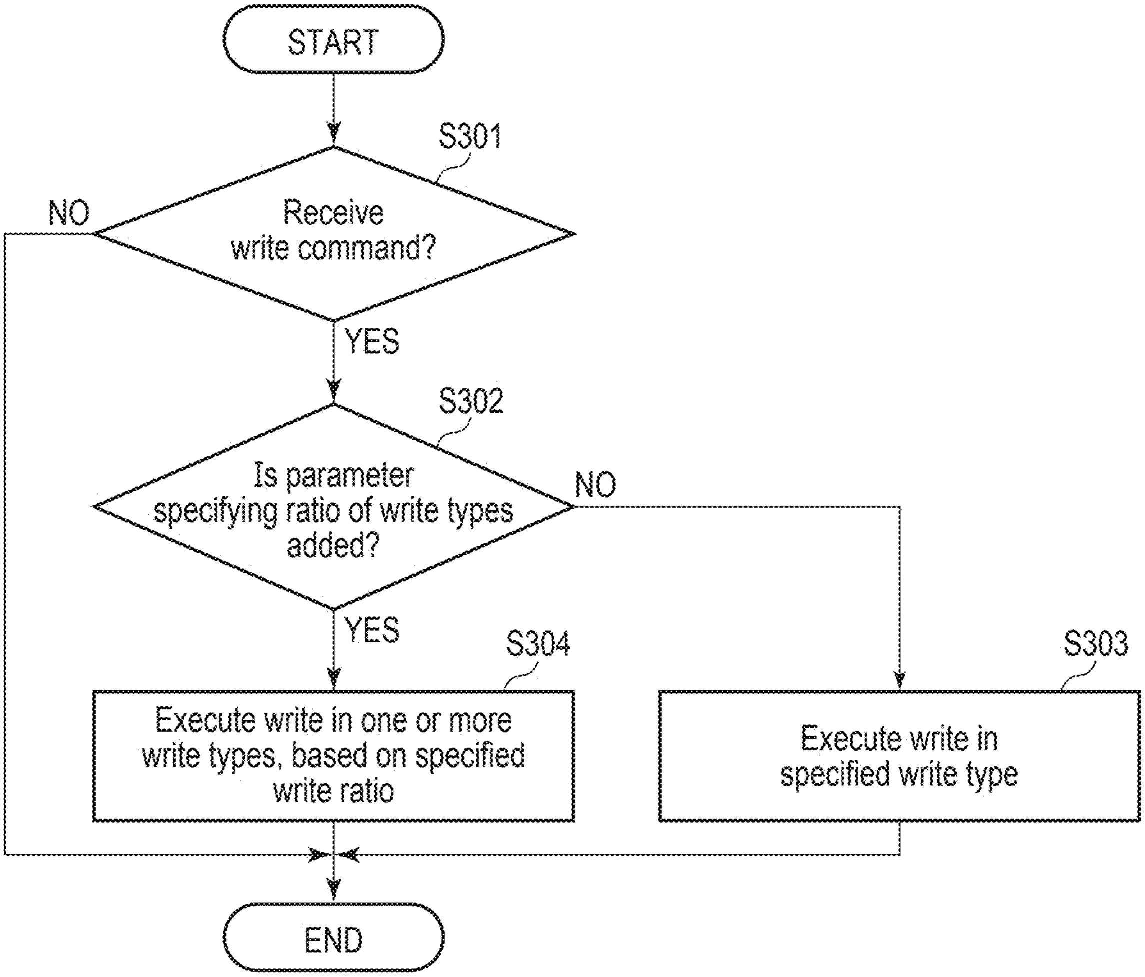
FIG. 7 is a flowchart showing the flow of operations when receiving a write command of the memory system of the third embodiment.

FIG. 7 is a flowchart showing the operation flow of the memory system 1 of the third embodiment upon reception of the write command.

The controller 11 determines whether or not the write command is received from the host 2 (S301). If the write command is not received (S301: NO), the controller 11 ends the operation related to the reception of the write command. If the write command is received (S301: YES), the controller 11 determines whether or not the parameter specifying the ratio of the write types is added to the write command (S302). If the parameter specifying the ratio of the write types is not added to the write command (S302: NO), the controller 11 executes writing data to the flash memory 12 with the specified write type (S303). The specified write type may be a predetermined single write type or may be a plurality of write types with predetermined write ratios.

In contrast, if the parameter specifying the ratio of the write types is added to the write command (S302: YES), the controller 11 executes writing data to the flash memory 12 with one or more write types, based on the specified write ratio (S304).

As described above, in the memory system 1 of the third embodiment, the host 2 can recognize and control the amount of data that can be written by specifying the write ratio.

Fourth Embodiment

Next, a fourth embodiment will be described. It is assumed that a memory system 1 of the fourth embodiment has the same configuration as the memory system 1 of the first embodiment. The same constituent elements as those of the memory system 1 of the first embodiment are denoted by the same reference numerals and their descriptions are omitted.

In the fourth embodiment, a ratio of write types is specified by a setting command instead of the performance level in the second embodiment. The memory system 1 of the fourth embodiment operates based on the ratio of the write types specified in advance for all received write commands.

In the fourth embodiment, the host 2 first sets the write ratio for the memory system 1. After that, the memory system 1 executes writing at the specified write ratio.

In the fourth embodiment, the host 2 directly specifies the write ratio for each write type. Therefore, the host 2 can easily recognize the remaining capacity of the memory system 1.

Figure 8:
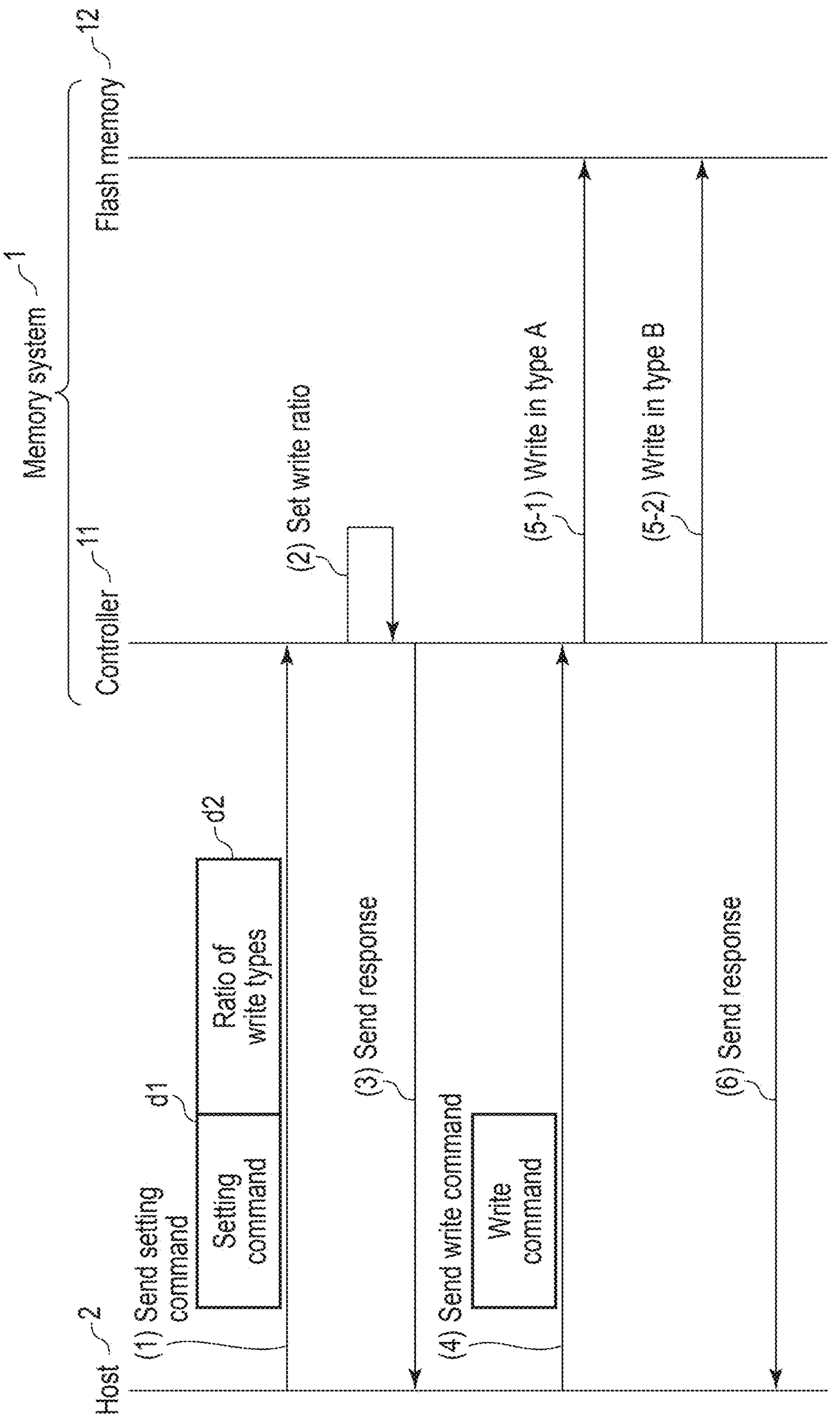
FIG. 8 is a sequence chart showing a flow of operations related to data write in an information processing system including a memory system of a fourth embodiment.

FIG. 8 is a sequence chart showing the operation procedure related to data write in the information processing system including the memory system 1 of the fourth embodiment.

Prior to sending a write command to the memory system 1, the host 2 sends a setting command d1 to which a parameter d2 specifying a ratio of write types is added, to the memory system 1 (1). When receiving the setting command d1 to which parameter d2 specifying the ratio of write types is added, the controller 11 of the memory system 1 sets the specified write ratio (2). When setting the write ratio is completed, the controller 11 of memory system 1 sends a response to the setting command to the host 2 (3).

After sending the setting command d1 to the memory system 1, the host 2 sends a write command to the memory system 1 (4). A parameter specifying the ratio of write type is not added to the write command.

When receiving the write command, the controller 11 of the memory system 1 executes writing the data to the flash memory 12 in the write type of type A (5-1) and writing the data to the flash memory 12 in the write type of type B (5-2), based on the write ratio which is set when receiving the setting command d1. When writing the data to the flash memory 12 is completed, the controller 11 of memory system 1 sends a response to the write command to the host 2 (6).

Figure 9:
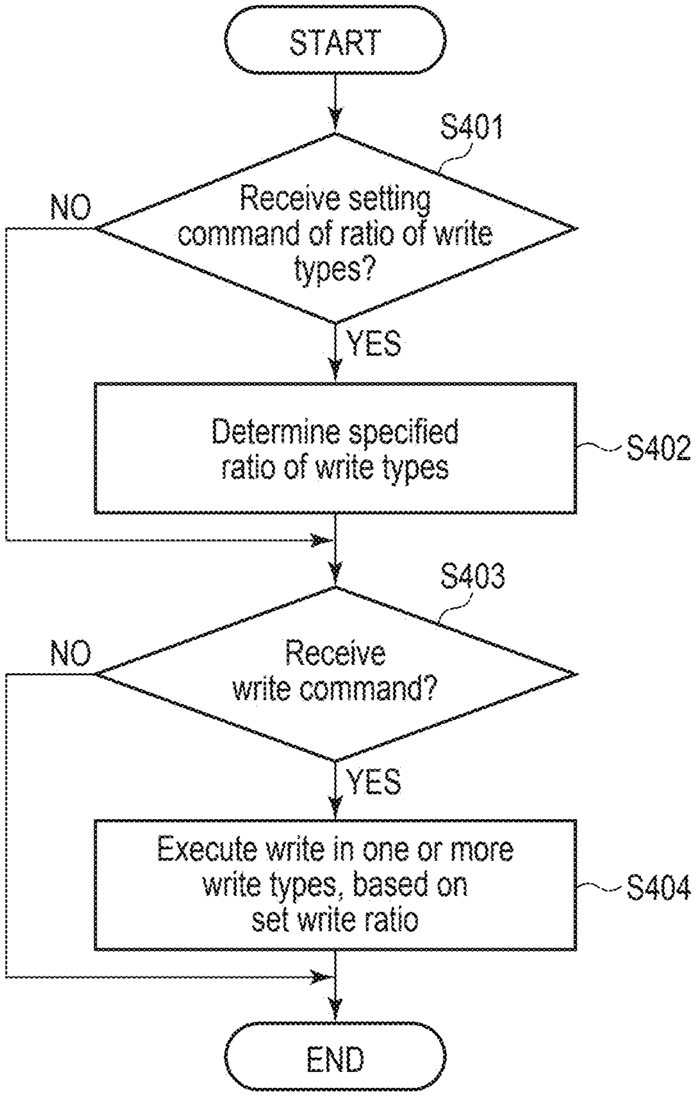
FIG. 9 is a flowchart showing the flow of operations when receiving a write command of the memory system of the fourth embodiment.

FIG. 9 is a flowchart showing the operation flow of the memory system 1 of the fourth embodiment upon reception of the write command.

The controller 11 determines whether or not a setting command of the ratio of write types is received from the host 2 (S401). If the setting command is received (S401: YES), the controller 11 sets the specified ratio of write types (S402). If the setting command is not received (S401: NO), the controller 11 skips the process in S402.

Next, the controller 11 determines whether or not the write command is received from the host 2 (S403). If the write command is received (S403: YES), the controller 11 executes writing the data to the flash memory 12 in one or more write types, based on the set write ratio (S404). If the write command is not received (S403: NO), the controller 11 ends the operation related to the reception of the write command.

As described above, in the memory system 1 of the fourth embodiment, since the processing related to the write ratio for each write command is reduced, in addition to the advantages of the memory system 1 of the third embodiment, the write speed can be optimized.

Fifth Embodiment

Next, a fifth embodiment will be described. It is assumed that a memory system 1 of the fifth embodiment has the same configuration as the memory system 1 of the first embodiment. The same constituent elements as those of the memory system 1 of the first embodiment are denoted by the same reference numerals and their descriptions are omitted.

In the fifth embodiment, a parameter specifying a throughput is added to the write command instead of the performance level in the first embodiment.

A host 2 sends the write command to which the parameter specifying the throughput is added to the memory system 1. The throughput refers to the amount of data written to a flash memory 12 per unit time by a controller 13. The controller 11 of the memory system 1 determines the write ratio, based on the specified throughput, by considering the write speed for each write type.

In the fifth embodiment, by using the following equation to convert the write ratio to the average write speed, write ratio $\alpha$ of the write type of type A and the write ratio $\beta$ of the write type of type B write type are determined while being given the average write speed v, in contrast to the first embodiment.

In the case of $v_a \geq v \geq v_b$, [Equation 1] can be transformed as follows.

$$\beta = \frac{1}{v_a - v_b}\left(\frac{v_a v_b}{v} - v_b\right) \quad \text{[Equation 5]}$$

$$\alpha = 1 - \beta \quad \text{[Equation 6]}$$

The write ratios $\alpha$ and $\beta$ are uniquely determined by the above equations. If $v_a \geq v \geq v_b$ is not satisfied but $v \leq v_b$, the controller 11 calculates based on $v = v_b$. If $v_a \geq v \geq v_b$ is not satisfied but $v \geq v_a$, the controller 11 calculates based on $v = v_a$.

Since the write ratio for each write type is determined by the above equation, the controller 11 executes writing according to the write ratio, similarly to the first embodiment.

In some cases, however, it may be difficult to execute this calculation for each write command. In such cases, when the memory system 1 is started up, the throughput and performance level are set to correspond between the memory system 1 and the host 2. After that, the host 2 may specify the throughput corresponding to the performance level for each write command. Therefore, the calculation load for each write command can be reduced.

In the fifth embodiment, the required write speed can be directly specified on the host 2 side, which improves the convenience of the memory system 1. In addition, the influence of the throughput of each write type can be hidden from the host 2, on the memory system 1. As a result, the host 2 no longer needs to consider the information on each write type of the memory system 1.

Figure 10:
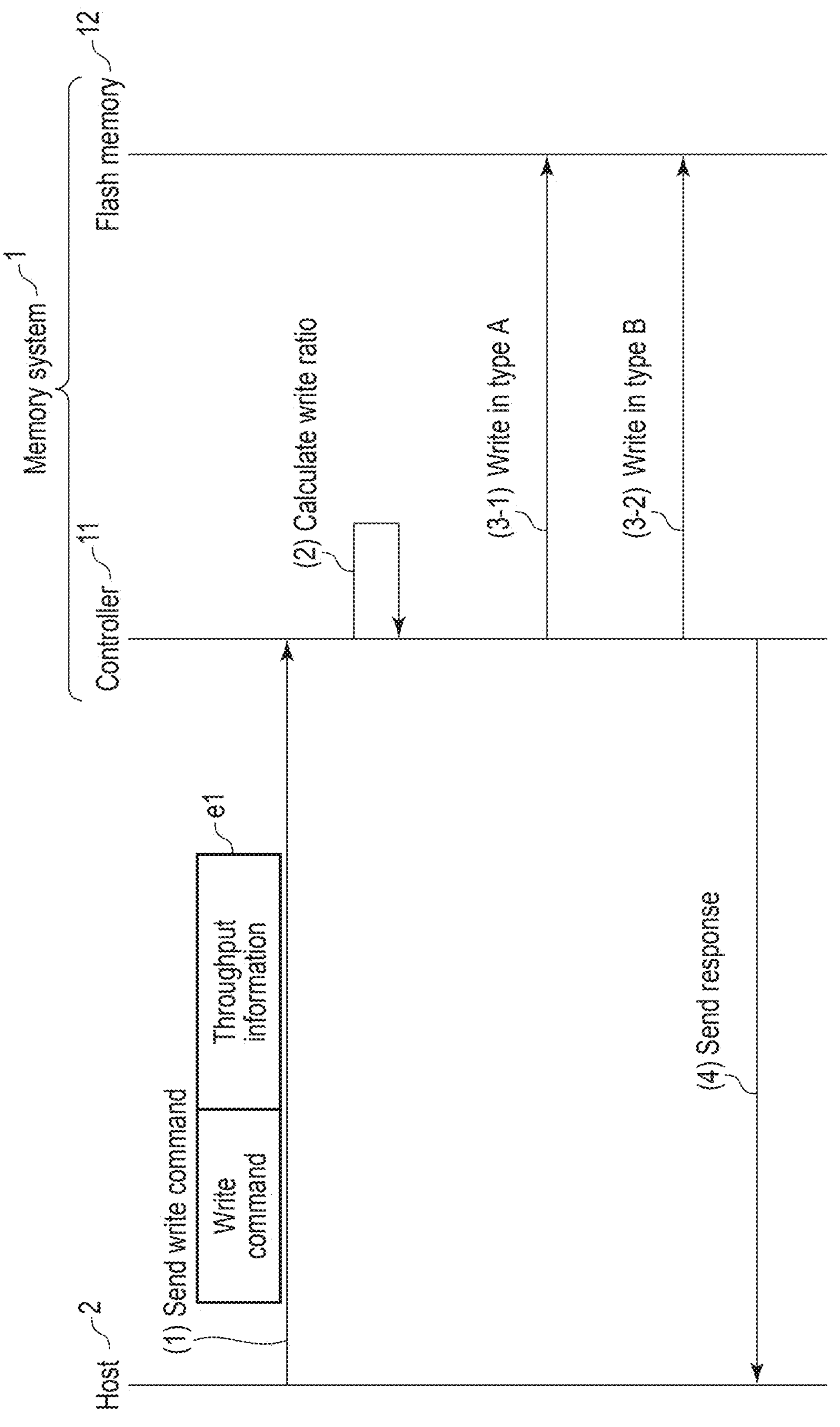
FIG. 10 is a sequence chart showing a flow of operations related to data write in an information processing system including a memory system of a fifth embodiment.

FIG. 10 is a sequence chart showing the operation procedure related to data write in the information processing system including the memory system 1 of the fifth embodiment.

The host 2 sends a write command to which parameter e1 specifying the throughput is added to the memory system 1 (1). When receiving the write command to which parameter e1 specifying the throughput is added, the controller 11 of the memory system 1 calculates the write ratio between the write type of type A and the write type of type B, based on the specified throughput (2).

The controller 11 of the memory system 1 executes writing the data to the flash memory 12 in the write type of type A (3-1) and writing the data to the flash memory 12 in the write type of type B (3-2), based on the calculated write ratio. When writing the data to the flash memory 12 is completed, the controller 11 of memory system 1 sends a response to the write command to the host 2 (4).

Figure 11:
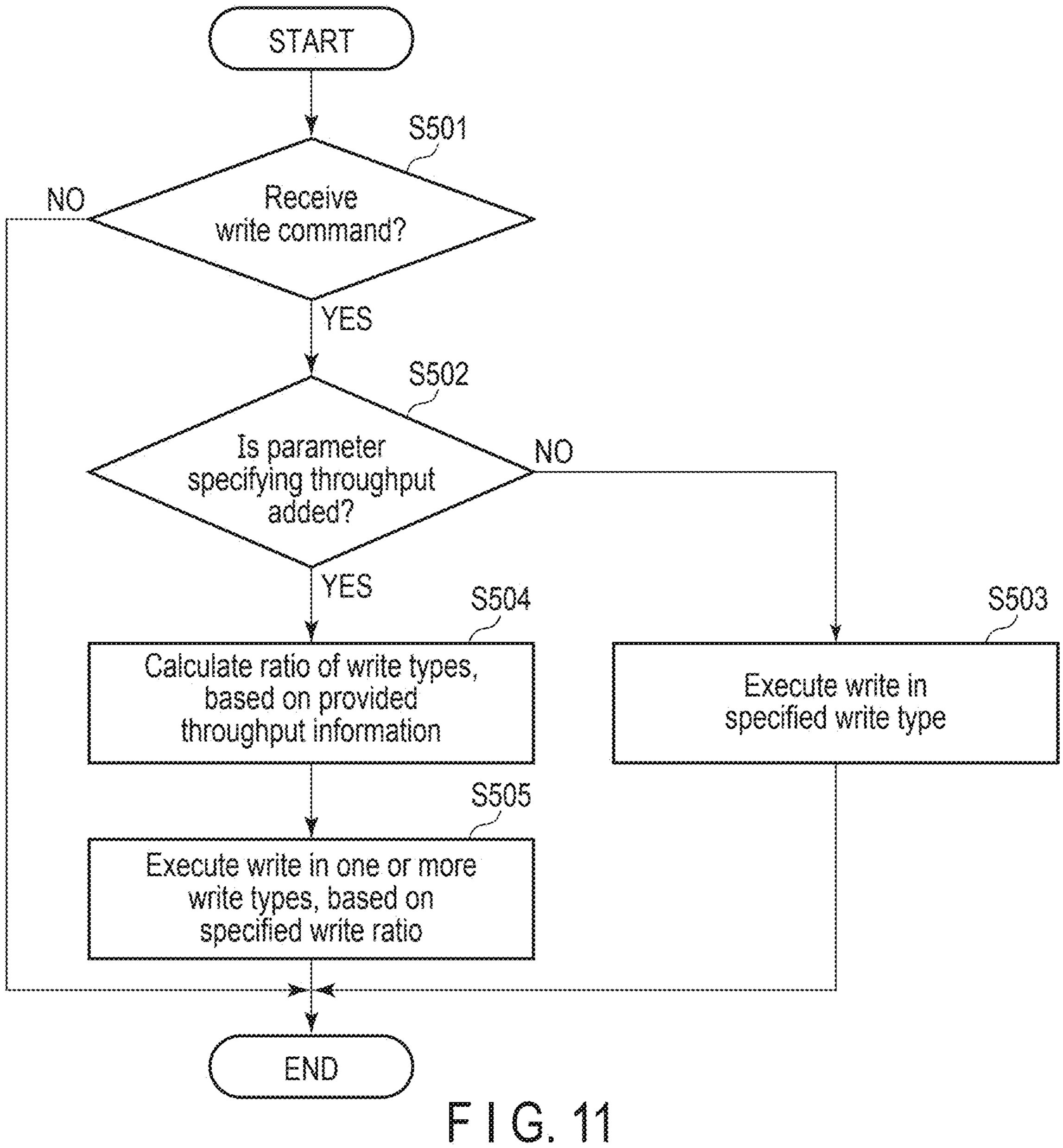
FIG. 11 is a flowchart showing the flow of operations when receiving a write command of the memory system of the fifth embodiment.

FIG. 11 is a flowchart showing the operation flow of the memory system 1 of the fifth embodiment upon reception of the write command.

The controller 11 determines whether or not the write command is received from the host 2 (S501). If the write command is not received (S501: NO), the controller 11 ends the operation related to the reception of the write command. If the write command is received (S501: YES), the controller 11 determines whether or not the parameter specifying the throughput to the write command (S502).

If the parameter specifying the throughput is not added to the write command (S502: NO), the controller 11 executes writing data to the flash memory 12 with the specified write type (S503). The specified write type may be a predetermined single write type or may be a plurality of write types with predetermined write ratios.

In contrast, if the parameter specifying the throughput is added to the write command (S502: YES), the controller 11 calculates the ratio of the write types, based on the specified throughput (S504). The calculated ratio of the write types may imply a case where the ratio of a certain write type is 100%.

The controller 11 executes writing the data to the flash memory 12 in one or more writes types, based on the calculated write ratio (S505).

As described above, in the memory system 1 of the fifth embodiment, the host 2 can write the data to the memory system 1 without considering the write speed of each write type of the memory system 1, simply by specifying the throughput.

Sixth Embodiment

Next, a sixth embodiment will be described. It is assumed that a memory system 1 of the sixth embodiment has the same configuration as the memory system 1 of the first embodiment. The same constituent elements as those of the memory system 1 of the first embodiment are denoted by the same reference numerals and their descriptions are omitted.

In the sixth embodiment, a throughput is specified by a setting command instead of the performance level in the second embodiment. The memory system 1 of the sixth embodiment sets the ratio of the write type corresponding to the specified throughput, and operates based on the ratio of the write type set in advance for all received write commands.

In the sixth embodiment, the host 2 first sets the throughput for the memory system 1. The memory system 1 calculates and sets the write ratio corresponding to the specified throughput using the above-mentioned equation. After that, the memory system 1 writes the data to the flash memory 12 at the set write ratio.

The sixth embodiment is also a mechanism in which the host 2 can easily set the desired write speed for the memory system 1, similarly to the fourth embodiment.

Figure 12:
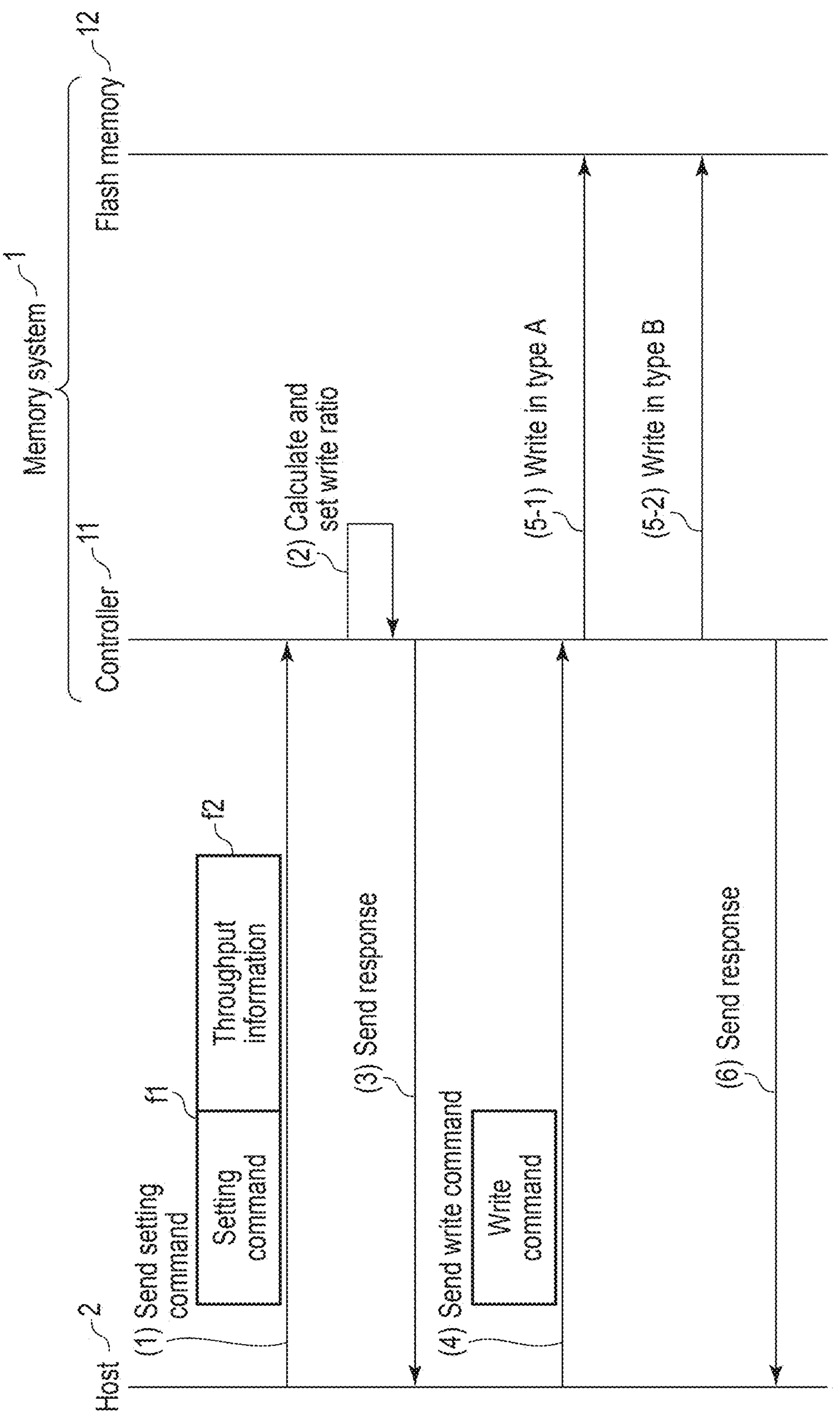
FIG. 12 is a sequence chart showing a flow of operations related to data write in an information processing system including a memory system of a sixth embodiment.

FIG. 12 is a sequence chart showing the operation procedure related to data write in the information processing system including the memory system 1 of the sixth embodiment.

Prior to sending a write command to the memory system 1, the host 2 sends a setting command f1 to which a parameter f2 specifying the throughput is added, to the memory system 1 (1). When receiving the setting command f1 to which parameter f2 specifying the throughput is added, the controller 11 of the memory system 1 calculates and sets the write ratio between the write type of type A and the write type of type B, based on the specified throughput (2). When setting the write ratio is completed, the controller 11 of memory system 1 sends a response to the setting command to the host 2 (3).

After sending the setting command f1 to the memory system 1, the host 2 sends a write command to the memory system 1 (4). A parameter specifying the throughput is not added to the write command.

When receiving the write command, the controller 11 of the memory system 1 executes writing the data to the flash memory 12 in the write type of type A (5-1) and writing the data to the flash memory 12 in the write type of type B (5-2), based on the write ratio which is set when receiving the setting command f1. When writing the data to the flash memory 12 is completed, the controller 11 of memory system 1 sends a response to the write command to the host 2 (6).

Figure 13:
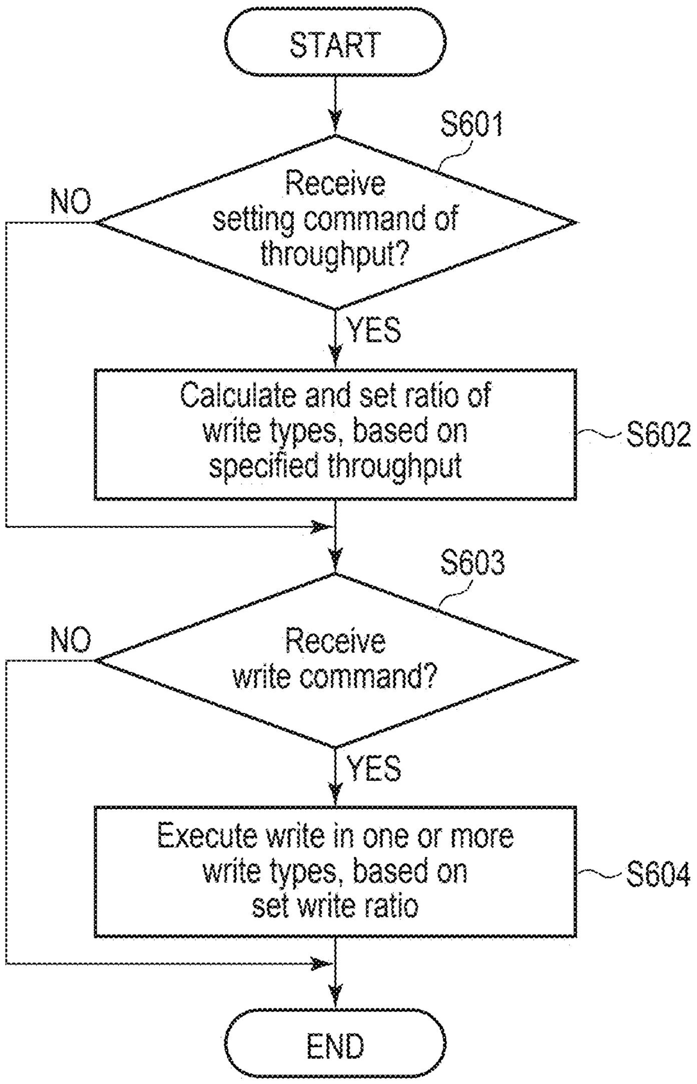
FIG. 13 is a flowchart showing the flow of operations when receiving a write command of the memory system of the sixth embodiment.

FIG. 13 is a flowchart showing the operation flow of the memory system 1 of the sixth embodiment upon reception of the write command.

The controller 11 determines whether or not the setting command of the throughput is received from the host 2 (S601). If the setting command is received (S601: YES), the controller 11 calculates and sets the ratio of the write types, based on the specified throughput (S602). If the setting command is not received (S601: NO), the controller 11 skips the process in S602.

Next, the controller 11 determines whether or not the write command is received from the host 2 (S603). If the write command is received (S603: YES), the controller 11 executes writing the data to the flash memory 12 in one or more write types, based on the set write ratio (S604). If the write command is not received (S603: NO), the controller 11 ends the operation related to the reception of the write command.

As described above, in the memory system 1 of the sixth embodiment, since the processing related to the write ratio for each write command is reduced, in addition to the advantages of the memory system 1 of the fifth embodiment, the write speed can be optimized.

Seventh Embodiment

Next, a seventh embodiment will be described. It is assumed that a memory system 1 of the seventh embodiment has the same configuration as the memory system 1 of the first embodiment. The same constituent elements as those of the memory system 1 of the first embodiment are denoted by the same reference numerals and their descriptions are omitted.

In the first to sixth embodiments, write control is executed using an instantaneous write speed as an indicator. In the seventh embodiment, information on the amount of data to be written is transferred in advance from the host 2 to the memory system 1, and the memory system 1 controls the write time to be short, based on this information.

In the seventh embodiment, first, the amount of data expected to be written from the host 2 to the memory system 1 within a certain period of time is set. This period is, for example, set to a time when writing from the host 2 is once ended and writing and the memory system 1 has an opportunity to execute background processing for its own maintenance.

The controller 11 of the memory system 1 calculates the write ratio that allows data to be written in the shortest time, based on the usage status of the flash memory 12.

When an expected data volume is set by the host 2, the controller 11 calculates the maximum usable primary receiving buffer size. If the free space in the flash memory 12 is represented by e, the amount of data to be written is represented by L, and the capacity ratio is represented by i, which is the ratio of the amount of data written to one memory cell by the slow write type to the amount of data written to one memory cell by the fast write type, then a relationship indicated by [Equation 7] is obtained.

$$L = s + (e - is) \quad \text{[Equation 7]}$$

In addition, the maximum usable primary receiving buffer sizes can be obtained by [Equation 8] that is obtained by transforming [Equation 7].

$$\begin{aligned} s &= \frac{L-e}{1-i} \\ &= \frac{e-L}{i-1} \end{aligned} \quad \text{[Equation 8]}$$

When calculating the write ratios α and β for the write types, calculation can be executed as follows.

$$\begin{aligned} \alpha &= \frac{s}{L} \\ &= \frac{L-e}{L(1-i)} \\ &= \frac{1-\frac{e}{L}}{1-i} \\ &= \frac{\frac{e}{L}-1}{i-1} \\ \beta &= 1-\alpha \\ &= \frac{i-\frac{e}{L}}{i-1} \end{aligned} \quad \text{[Equation 9]}$$

For example, in a case of calculating the write ratio between SLC and TLC, the calculation can be executed using the equations [Equation 7], [Equation 8], and [Equation 9], with e representing the free space in the flash memory 12 converted by assuming the write to normal storage (i.e. TLC), and i representing 3, which is the capacity ratio between SLC and TLC.

The controller 11 secures the SLC buffer size according to the ratio in the above equation, and then writes data similarly to the second embodiment. The average write speed at this time can be estimated using [Equation 1]. In addition, the combination of the write type that enables writing at a high speed and the write type that enables writing at a low speed is not limited to the combination of SLC and TLC. Similarly to the second embodiment, combinations of write types other than SLC and TLC can also be applied.

Figure 14:
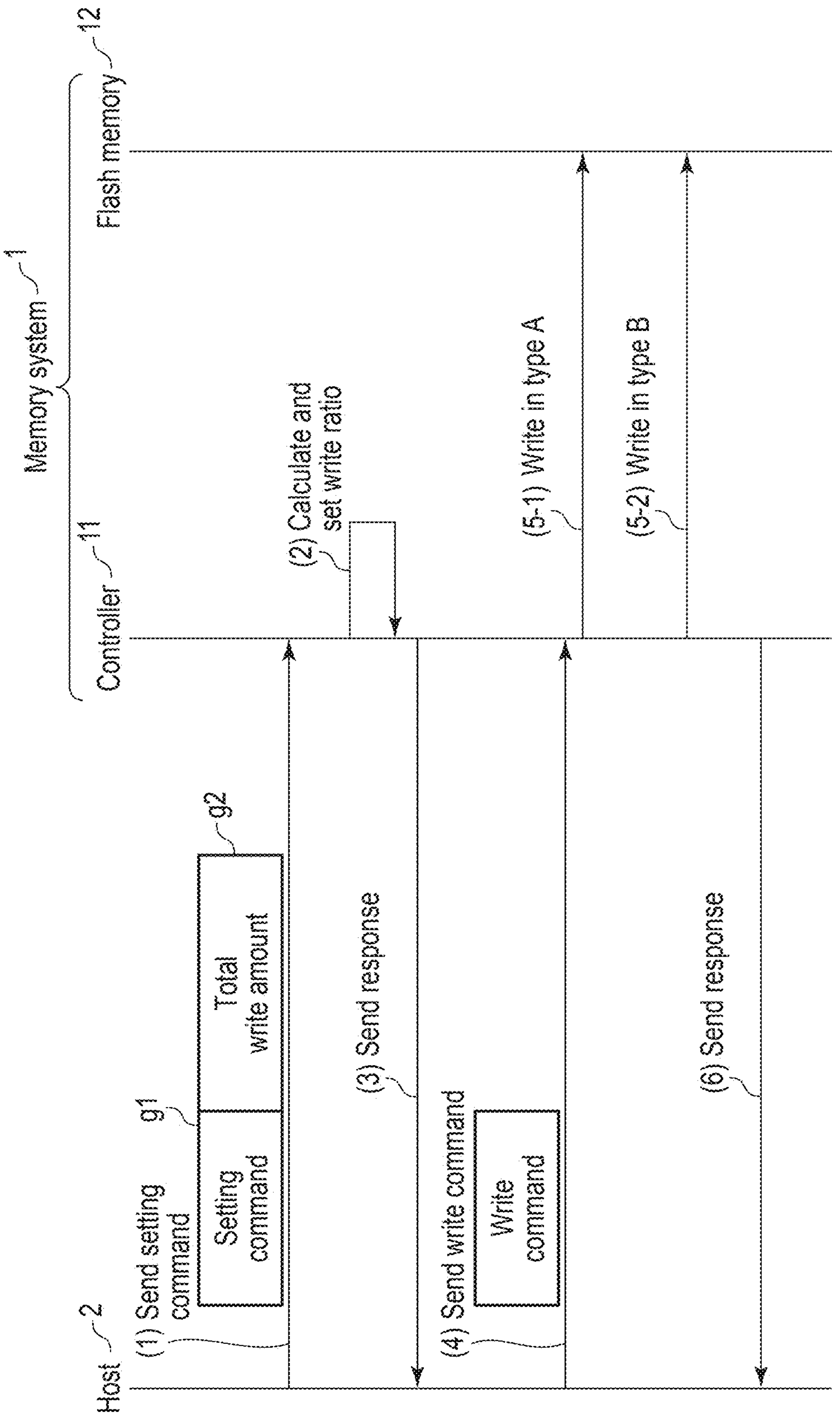
FIG. 14 is a sequence chart showing a flow of operations related to data write in an information processing system including a memory system of a seventh embodiment.

FIG. 14 is a sequence chart showing the operation procedure related to data write in the information processing system including the memory system 1 of the seventh embodiment.

Prior to sending a write command to the memory system 1, the host 2 sends a setting command g1 to which a parameter g2 specifying the total write amount is added, to the memory system 1 (1). When receiving the setting command g1 to which parameter g2 specifying the total write amount is added, the controller 11 of the memory system 1 calculates and sets the write ratio between the write type of type A and the write type of type B, based on the specified total write amount (2). When setting the write ratio is completed, the controller 11 of memory system 1 sends a response to the setting command to the host 2 (3).

After sending the setting command g1 to the memory system 1, the host 2 sends a write command to the memory system 1 (4). A parameter specifying the total write amount is not added to the write command.

When receiving the write command, the controller 11 of the memory system 1 executes writing the data to the flash memory 12 in the write type of type A (5-1) and writing the data to the flash memory 12 in the write type of type B (5-2), based on the write ratio which is set when receiving the setting command g1. When writing the data to the flash memory 12 is completed, the controller 11 of memory system 1 sends a response to the write command to the host 2 (6).

Figure 15:
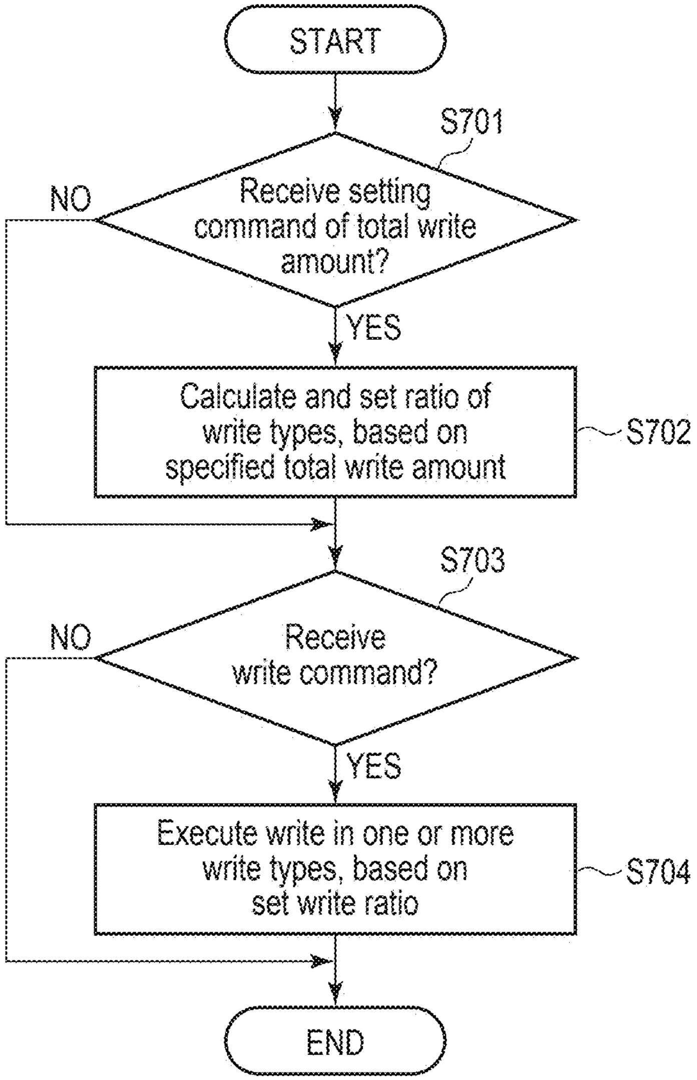
FIG. 15 is a flowchart showing the flow of operations when receiving a write command of the memory system of the seventh embodiment.

FIG. 15 is a flowchart showing the operation flow of the memory system 1 of the seventh embodiment upon reception of the write command.

The controller 11 determines whether or not a setting command of the total write amount is received from the host 2 (S701). If the setting command is received (S701: YES), the controller 11 calculates and sets the ratio of the write types, based on the specified total write amount (S702). If the setting command is not received (S701: NO), the controller 11 skips the process in S702.

Next, the controller 11 determines whether or not the write command is received from the host 2 (S703). If the write command is received (S703: YES), the controller 11 executes writing the data to the flash memory 12 in one or more write types, based on the set write ratio (S704). If the write command is not received (S703: NO), the controller 11 ends the operation related to the reception of the write command.

For example, in the memory system 1 of the second embodiment, if a more amount of data than expected is written, migration processing may be executed and the expected advantage may not be achieved. In the memory system 1 of the seventh embodiment, occurrence that an amount of data than expected is written is reduced, and the advantage of the memory system 1 of the second embodiment can be obtained more reliably.

In addition, in the memory system 1 of the seventh embodiment, the shortest write time can be achieved by the controller 11 executing write control in consideration of the usage status of the flash memory 12.

Eighth Embodiment

Next, an eighth embodiment will be described. It is assumed that a memory system 1 of the eighth embodiment has the same configuration as the memory system 1 of the first embodiment. The same constituent elements as those of the memory system 1 of the first embodiment are denoted by the same reference numerals and their descriptions are omitted.

In the eighth embodiment, a write time is specified by a setting command instead of the performance level in the second embodiment. The memory system 1 of the eighth embodiment calculates the throughput in a case where data is written in the specified time based on the usage status of the flash memory 12. The memory system 1 of the eighth embodiment further calculates and sets the ratio of the write type corresponding to the calculated throughput, and operates based on the ratio of the write type set for all received write commands.

Using up the free space e in the flash memory 12 in the time t specified by the host 2 will be considered. In this case, e is assigned to the primary receiving buffer and the normal storage, and the amount of data that can be written from the host 2 as a result of assignment is represented by L. L is a value indicating how much data size can be written from the host 2, similarly to [Equation 7]. Here, e represents the free space in the flash memory 12 converted assuming the write to the normal storage. Based on the above, [equation 10] is established as the relationship between e, t and s.

$$t = \frac{L}{v} = \frac{s}{v_a} + \frac{e - is}{v_b} \qquad \text{[equation 10]}$$

$$t - \frac{e}{v_b} = s\left(\frac{1}{v_a} - \frac{i}{v_b}\right)$$

$$s = \frac{t - \frac{e}{v_b}}{\frac{1}{v_a} - \frac{i}{v_b}} = \frac{tv_b - e}{\frac{v_b}{v_a} - i}$$

$$s = \frac{e - tv_b}{i - \frac{v_b}{v_a}}$$

The primary receiving buffer sizes in a case of writing e using t can be calculated from the [equation 10]. Similarly, the write ratio can be calculated as follows by considering equation [equation 7].

$$\alpha = \frac{s}{L} = \frac{1}{1 - i + \frac{e}{s}} \qquad \text{[equation 11]}$$

$$\beta = 1 - \alpha$$

By writing the data using the write ratio calculated in this manner, e is used up within the specified time. The data is written similarly to the second embodiment after securing the primary receiving buffer sizes calculated using [equation 10]. The write type upon writing the data to the primary receiving buffer may be SLC, and the write type upon writing the data to the normal storage may be TLC. In addition, the combination of the write type that enables the data to be written to the primary receiving buffer and the write type that enables the data to be written to the normal storage is not limited to the combination of SLC and TLC. Similarly to the second embodiment, combinations of write types other than SLC and TLC can also be applied.

Figure 16:
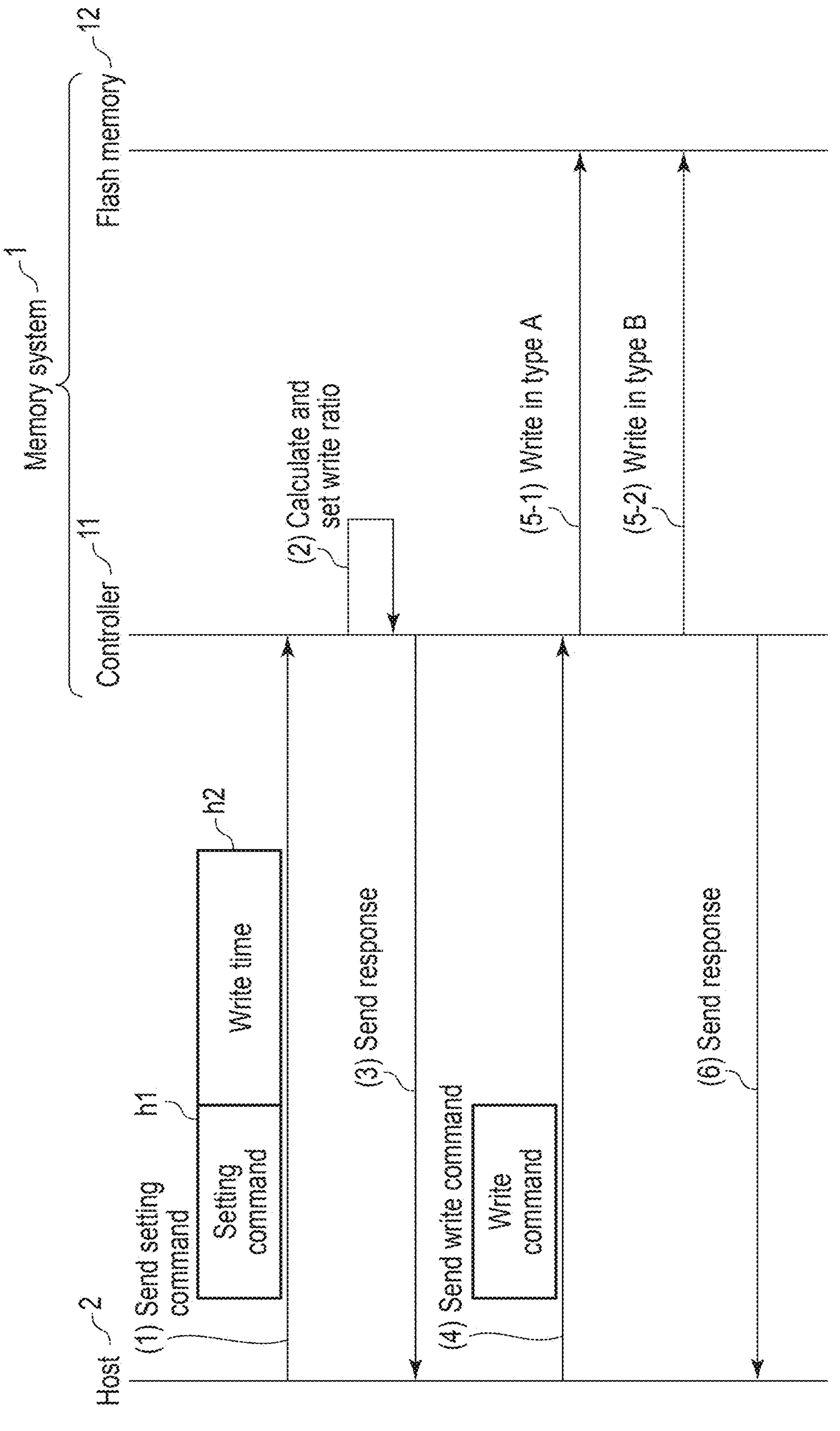
FIG. 16 is a sequence chart showing a flow of operations related to data write in an information processing system including a memory system of an eighth embodiment.

FIG. 16 is a sequence chart showing the operation procedure related to data write in the information processing system including the memory system 1 of the eighth embodiment.

Prior to sending a write command to the memory system 1, the host 2 sends a setting command h1 to which a parameter h2 specifying the write time is added, to the memory system 1 (1). When receiving the setting command h1 to which parameter h2 specifying the write time is added, the controller 11 of the memory system 1 calculates and sets the write ratio between the write type of type A and the write type of type B, based on the specified write time (2). When setting the write ratio is completed, the controller 11 of memory system 1 sends a response to the setting command to the host 2 (3).

After sending the setting command h1 to the memory system 1, the host 2 sends a write command to the memory system 1 (4). A parameter specifying the write time is not added to the write command.

When receiving the write command, the controller 11 of the memory system 1 executes writing the data to the flash memory 12 in the write type of type A (5-1) and writing the data to the flash memory 12 in the write type of type B (5-2), based on the write ratio which is set when receiving the setting command h1. When writing the data to the flash memory 12 is completed, the controller 11 of memory system 1 sends a response to the write command to the host 2 (6).

Figure 17:
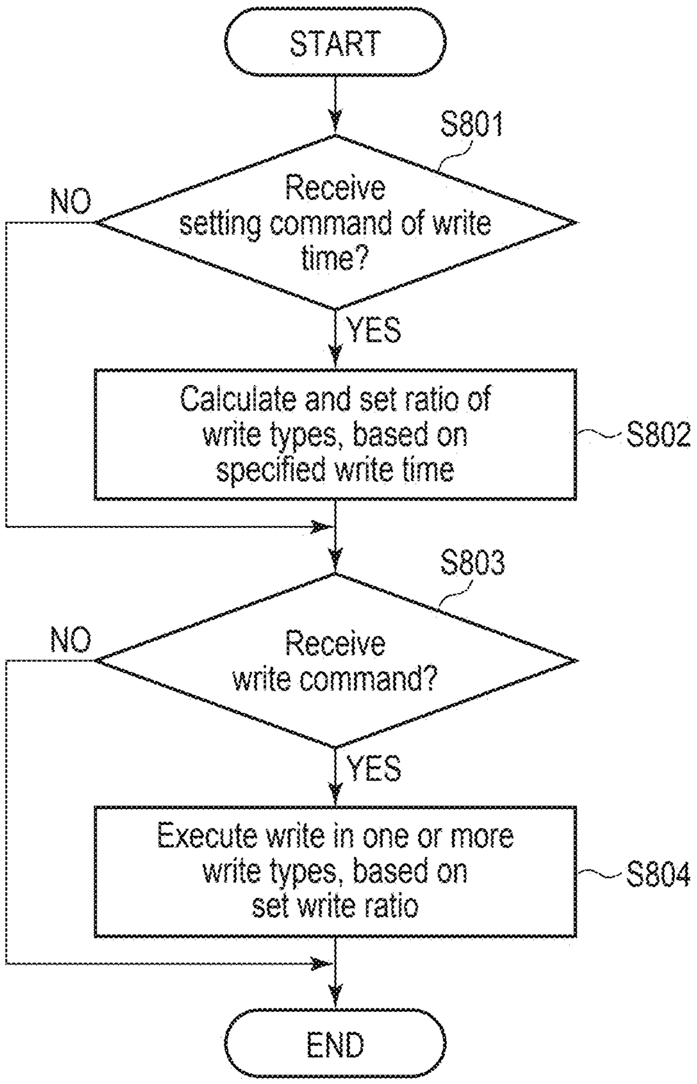
FIG. 17 is a flowchart showing the flow of operations when receiving a write command of the memory system of the eighth embodiment.

FIG. 17 is a flowchart showing the operation flow of the memory system 1 of the eighth embodiment upon reception of the write command.

The controller 11 determines whether or not a setting command of the write time is received from the host 2 (S801). If the setting command is received (S801: YES), the controller 11 calculates and sets the ratio of the write types, based on the specified write time (S802). If the setting command is not received (S801: NO), the controller 11 skips the process in S802.

Next, the controller 11 determines whether or not the write command is received from the host 2 (S803). If the write command is received (S803: YES), the controller 11 executes writing the data to the flash memory 12 in one or more write types, based on the set write ratio (S804). If the write command is not received (S803: NO), the controller 11 ends the operation related to the reception of the write command.

As described above, in the memory system 1 of the eighth embodiment, scheduling of the processing of command issuance in the host 2 can be facilitated by specifying the write time, in addition to the advantages of the memory system 1 of the second embodiment.

Ninth Embodiment

Next, a ninth embodiment will be described. The ninth embodiment shows an example of the behavior of the memory system 1 in a case where the performance level (first embodiment) or the throughput (fifth embodiment) is specified by the write command parameters from a plurality of hosts 2.

Figure 18:
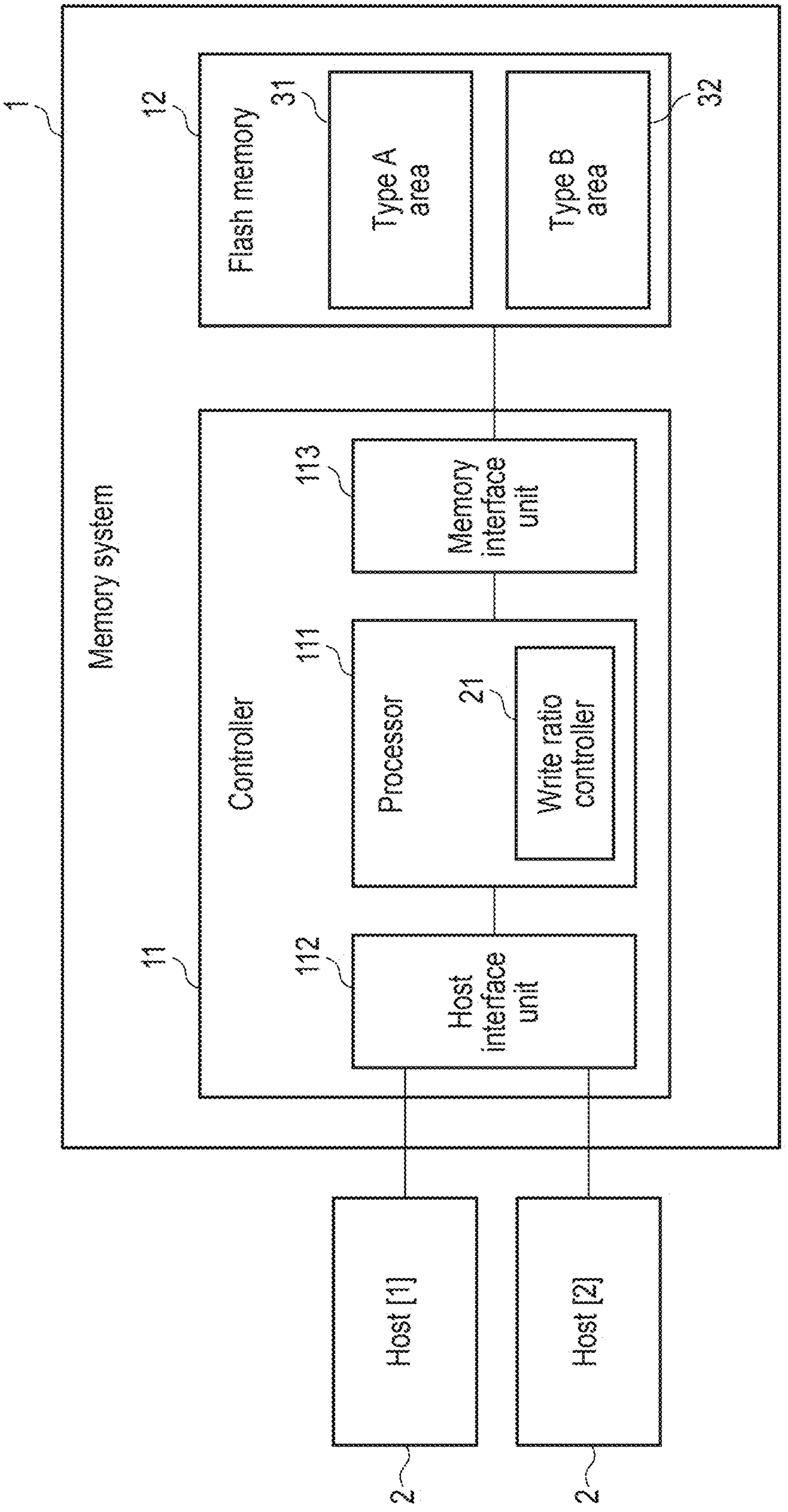
FIG. 18 is a view showing an example of a configuration of an information processing system including a memory system of a ninth embodiment and a host connected to the memory system.

FIG. 18 is a view showing an example of a configuration of an information processing system including a memory system 1 of the ninth embodiment and a host 2 connected to the memory system 1.

As shown in FIG. 18, a controller 11 of the memory system 1 of the ninth embodiment can accept commands from the plurality of hosts 2. An example of receiving a write command to which a parameter specifying the performance level is added from the plurality of the hosts 2 (referred to as host [1] and host [2]) will be described.

When receiving write commands to which parameters specifying performance levels are added from the plurality of the hosts 2, the controller 11 of the memory system 1 of the ninth embodiment increases the performance level in the memory system 1 so as to satisfy all of the performance requests from the plurality of the hosts 2. The controller 11 decreases the performance level in the memory system 1 sequentially as execution of each write command is completed.

For example, if performance level 1 is specified by the first write command from host [1] and performance level 3 is specified by the second write command from host [2], the controller 11 sets the performance level in the memory system 1 to performance level 4. The controller 11 writes the data of the first write command and the data of the second write command to the flash memory 12 at a write ratio corresponding to performance level 4.

When completing the execution of the write command specifying performance level 1, the controller 11 decreases the performance level in the memory system 1 from performance level 4 to performance level 3. In other words, when completing write of the data of the first write command, the controller 11 decreases the performance level to 3. The controller 11 writes the data of the second write command to the flash memory 12 at performance level 3.

As another example, if a throughput of 1 GiB/s is specified by the third write command from host [1] and a throughput of 2 GiB/s is specified by the fourth write command from host [2], the controller 11 causes the memory system 1 to operate at a throughput of 3 GiB/s. When completing execution of the third write command that specifies a throughput of 1 GiB/s, the controller 11 causes the memory system 1 to operate at a throughput of 2 GiB/s.

Therefore, the memory system 1 of the ninth embodiment can sufficiently obtain the advantages of the memory system 1 of the first embodiment or the fifth embodiment even when the performance level and the throughput are specified by the plurality of the hosts 2.

Tenth Embodiment

Next, a tenth embodiment will be described. The tenth embodiment shows an example of the behavior of the memory system 1 in a case where the performance level (second embodiment), throughput (sixth embodiment), total write amount (seventh embodiment), and write time (eighth embodiment) are specified by setting commands from a plurality of hosts 2.

Similarly to the memory system 1 of the ninth embodiment, a controller 11 of the memory system 1 of the tenth embodiment can accept commands from a plurality of hosts 2. An example of receiving a setting command to which a parameter specifying the performance level is added from the plurality of the hosts 2 will be described.

When receiving setting commands to which parameters specifying performance levels are added from the plurality of the hosts 2, the controller 11 of the memory system 1 of the tenth embodiment increases the performance level in the memory system 1 so as to satisfy all of the performance requests from the plurality of the hosts 2. The controller 11 determines and sets the write ratio of the plurality of the write types, based on the increased performance level.

In addition, the controller 11 decreases the performance level in the memory system 1 in accordance with the instruction to cancel the setting of the performance level from each host 2. The controller 11 determines and sets the write ratio of the plurality of the write types, based on the decreased performance level.

For example, if performance level 1 is specified by the first setting command from host [1] and performance level 3 is specified by the second setting command from host [2], the controller 11 sets the performance level in the memory system 1 to performance level 4. The controller 11 writes the data of the write command from the host 2, to the flash memory 12, at a write ratio corresponding to performance level 4.

If instructed to cancel performance level 1 by host [1], the controller 11 decreases the performance level in the memory system 1 from performance level 4 to performance level 3.

Therefore, the memory system 1 of the tenth embodiment can sufficiently obtain the advantages of the memory system 1 of the second embodiment, sixth embodiment, the seventh embodiment, and the eighth embodiment even when the performance level, the throughput, the total write amount, and the write time are specified by the plurality of the hosts 2.

Eleventh Embodiment

Next, an eleventh embodiment will be described. It is assumed that a memory system 1 of the eleventh embodiment has the same configuration as the memory system 1 of the first embodiment. The same constituent elements as those of the memory system 1 of the first embodiment are denoted by the same reference numerals and their descriptions are omitted.

The eleventh embodiment is an example in which the memory system 1 has a performance information output mechanism such that the host 2 determines the performance level, the ratio of write types, throughput, write time, and the like. An example in which the host 2 specifies the performance level for the memory system 1 will be described.

Before specifying the performance level, the host 2 queries the memory system 1 for performance information on the memory system 1. The performance information includes the throughput corresponding to the performance level, generation information of the flash memory 12, upper and lower limits of the throughput which the memory system 1 can achieve, the rate of increase in the amount of data written to the primary receiving buffer, and the like. The performance information refers to all the information needed to determine the performance level. The memory system 1 sends the performance information to the host 2 in response to the inquiry from the host 2.

The host 2 determines which performance level to be used in what situation, based on the performance information acquired from the memory system 1. The memory system 1 operates similarly to the memory system 1 of the first and second embodiments, based on the performance level specified by Host 2.

Figure 19:
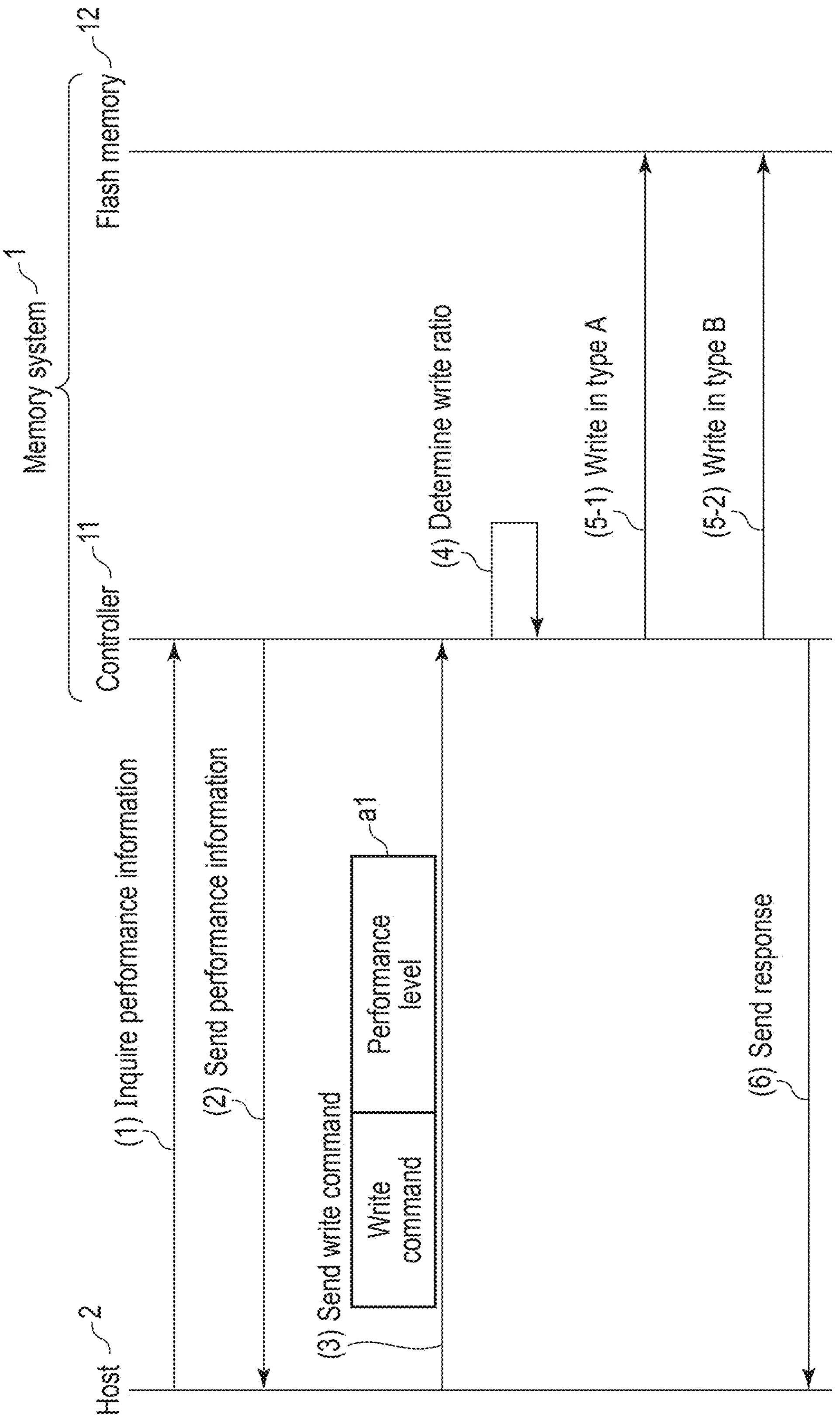
FIG. 19 is a sequence chart showing a flow of operations related to data write in an information processing system including a memory system of an eleventh embodiment.

FIG. 19 is a sequence chart showing the operation procedure related to data write in the information processing system including the memory system 1 of the eleventh embodiment.

Prior to sending a write command to the memory system 1, the host 2 inquires the performance information from the memory system 1 (1). The controller 11 of the memory system 1 receiving this inquiry sends the performance information of the memory system 1 to the host 2 (2).

The host 2 determines the performance level based on the performance information received from the memory system 1, and then sends a write command to which the parameter al specifying the determined performance level is added to the memory system 1 (3).

When receiving the write command to which parameter al specifying the performance level is added, the controller 11 of the memory system 1 determines the write ratio between the write type of type A and the write type of type B, based on the specified performance level (4). The controller 11 of the memory system 1 executes writing the data to the flash memory 12 in the write type of type A (5-1) and writing the data to the flash memory 12 in the write type of type B (5-2), based on the determined write ratio. When writing the data to the flash memory 12 is completed, the controller 11 of memory system 1 sends a response to the write command to the host 2 (6).

Figure 20:
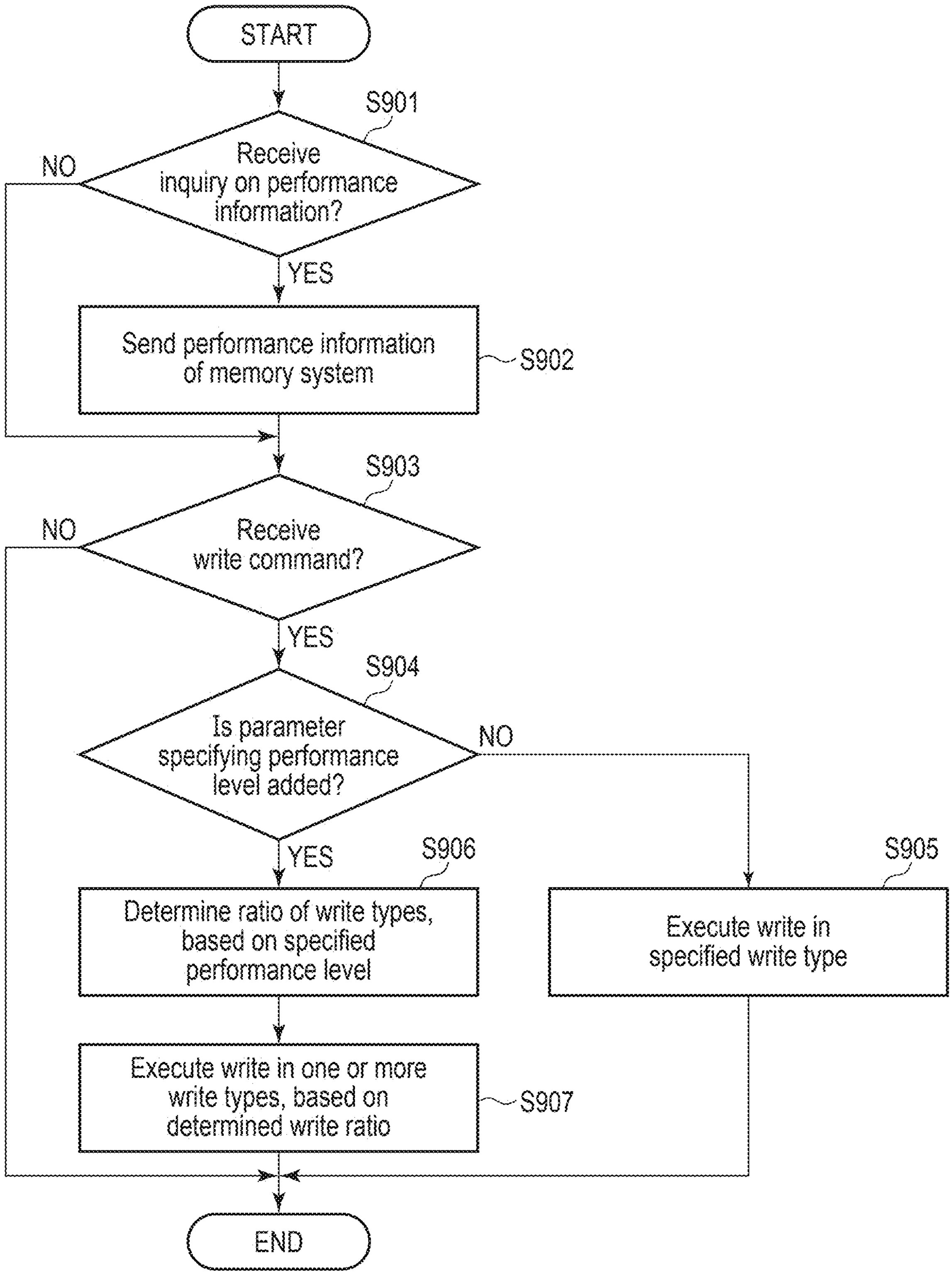
FIG. 20 is a flowchart showing the flow of operations when receiving a write command of the memory system of the eleventh embodiment.

FIG. 20 is a flowchart showing the operation flow of the memory system 1 of the eleventh embodiment upon reception of the write command.

The controller 11 determines whether or not to receive an inquiry for performance information from the host 2 (S901). If the inquiry is received (S901: YES), the controller 11 sends the performance information of the memory system 1 to the host 2 (S902). If the inquiry is not received (S901: NO), the controller 11 skips the process in S902.

In addition, the controller 11 determines whether or not the write command is received from the host 2 (S903). If the write command is not received (S903: NO), the controller 11 ends the operation related to the reception of the write command. If the write command is received (S903: YES), the controller 11 determines whether or not the parameter specifying the performance level is added to the write command (S904).

If the parameter specifying the performance level is not added to the write command (S904: NO), the controller 11 executes writing to the flash memory 12 with the specified write type (S905). The specified write type may be a predetermined single write type or may be plurality of write types with predetermined write ratios.

In contrast, if the parameter specifying the performance level is added to the write command (S904: YES), the controller 11 determines the ratio of the write types based on the specified performance level (S906). The determined ratio of the write types may imply a case where the ratio of a certain write type is 100%.

The controller 11 executes writing the data to the flash memory 12 in one or more writes types, based on the determined write ratio (S907).

As described above, in the memory system 1 of the eleventh embodiment, the host 2 enables the memory system 1 to execute the operations of obtaining any advantages of the memory systems 1 of the first to tenth embodiments after determining the characteristics of the connected memory system 1.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory; and
a controller connectable to a host and configured to control the nonvolatile memory, wherein
the controller is configured to:
write data to the nonvolatile memory using a plurality of write types based on information from the host, which is related to a write speed, the plurality of the write types have different data write speeds;
when receiving a write command to which a parameter specifying the information is added from the host, determine a write ratio of the plurality of the write types in accordance with the information; and
write data to the nonvolatile memory by mixing the plurality of the write types at the determined write ratio.

2. The memory system of claim 1, wherein
the plurality of write types include at least a first write type and a second write type, and
the controller is configured to determine a write ratio of the first write type and the second write type.

3. The memory system of claim 1, wherein
the controller is configured to:
receive a first write command requesting to write first data; and
write the first data to the nonvolatile memory by mixing two or more write types among the plurality of the write types.

4. The memory system of claim 1, wherein
the controller includes a volatile memory, and
the controller is configured to, when the parameter is not added to the write command, write data to the nonvolatile memory by mixing the plurality of the write types at a write ratio stored in the volatile memory before receiving the write command.

5. The memory system of claim 1, wherein
the information related to the write speed is a performance level.

6. The memory system of claim 5, wherein
the controller is connectable to a plurality of hosts, and
the controller is configured to, when receiving a plurality of write commands to which parameters each specifying a performance level are added, from the plurality of the hosts, respectively,
calculate a performance level obtained by summing the performance levels specified by the parameters added to the plurality of the write commands received from the plurality of the hosts, respectively,
determine the write ratio in accordance with the calculated performance level, and
write data to the nonvolatile memory by mixing the plurality of the write types at the determined write ratio.

7. The memory system of claim 1, wherein
the information related to the write speed is a throughput.

8. The memory system of claim 7, wherein
the controller is connectable to plurality of hosts, and
the controller is configured to, when receiving a plurality of write commands to which parameters each specifying a throughput are added, from the plurality of the hosts, respectively,
calculate a throughput obtained by summing the throughputs specified by the parameters added to the write commands received from the plurality of the hosts, respectively,
determine the write ratio in accordance with the calculated throughput, and
execute writing data to the nonvolatile memory by mixing the plurality of the write types at the determined write ratio.

9. The memory system of claim 1, wherein
the controller is configured to, when receiving a write command to which the write ratio of the plurality of the write types is added from the host, write data to the nonvolatile memory by mixing the plurality of the write types at the write ratio.

10. The memory system of claim 1, wherein
the controller is configured, when receiving an inquiry on the memory system from the host, to send performance information of the memory system to the host.

11. A memory system comprising:
a nonvolatile memory; and
a controller connectable to a host and configured to control the nonvolatile memory, wherein
the controller is configured to:
write data to the nonvolatile memory using a plurality of write types based on information provided by the host, the plurality of the write types have different data write speeds;
determine a write ratio of the plurality of the write types;
determine, when receiving a setting command to which parameter specifying information on a write speed is added from the host, the write ratio in accordance with the information on the write speed; and
write, when receiving a write command from the host after receiving the setting command, data to the nonvolatile memory using the plurality of the write types at the determined write ratio.

12. The memory system of claim 11, wherein
the information related to the write speed is a performance level.

13. The memory system of claim 12, wherein
the controller is connectable to a plurality of hosts, and
the controller is configured to, when receiving a plurality of setting commands to which parameters each specifying a performance level are added, from the plurality of the hosts, respectively, to:
calculate a performance level obtained by summing the performance levels specified by the parameters added to the setting commands received from the plurality of the hosts, respectively; and
determine the write ratio in accordance with the calculated performance level.

14. The memory system of claim 11, wherein
the information related to the write speed is a throughput, and
the throughput is an amount of data written per unit time.

15. The memory system of claim 14, wherein
the controller is connectable to a plurality of hosts, and
the controller is configured to, when receiving a plurality of setting commands to which parameters each specifying a throughput are added, from the plurality of the hosts, respectively,
calculate a throughput obtained by summing the throughputs specified by the parameters added to the setting commands received from the plurality of the hosts, respectively, and
determine the write ratio in accordance with the calculated throughput.

16. The memory system of claim 11, wherein
the information related to the write speed is a total write amount.

17. The memory system of claim 16, wherein
the controller is connectable to a plurality of hosts, and
the controller is configured to, when receiving a plurality of setting commands to which parameters each specifying total write amount are added, from the plurality of the hosts, respectively,
calculate a total value of the total write amounts specified by the parameters added to the setting commands received from the plurality of the hosts, respectively, and
determine the write ratio of the plurality of the write types in accordance with the calculated total value of the total write amounts.

18. The memory system of claim 11, wherein
the information related to the write speed is a write time.

19. The memory system of claim 18, wherein
the controller is connectable to a plurality of hosts, and
the controller is configured to, when receiving multiple setting commands to which parameters each specifying a write time are added, from the plurality of the hosts, respectively,
calculate a write time obtained by summing the write times specified by the parameters added to the setting commands received from the plurality of the hosts, respectively, and
determine the write ratio in accordance with the calculated write time.

20. The memory system of claim 11, wherein
the controller is configured to, when receiving a write command to which the write ratio of the plurality of the write types is added from the host, write data to the nonvolatile memory by mixing the plurality of the write types at the write ratio.

21. The memory system of claim 11, wherein
the controller is configured, when receiving an inquiry on the memory system from the host, to send performance information of the memory system to the host.

22. A memory system comprising:
a nonvolatile memory; and
a controller connectable to a host and configured to control the nonvolatile memory, wherein
the controller is configured to:
write data to the nonvolatile memory using a plurality of write types based on information provided by the host, the plurality of the write types have different data write speeds;
determine a write ratio of the plurality of the write types;
set, when receiving a setting command to which a parameter specifying the write ratio is added from the host, the write ratio specified by the parameter; and
write, when receiving a write command from the host after receiving the setting command, data to the nonvolatile memory by mixing the plurality of the write types at the set write ratio.

23. The memory system of claim 22, wherein
the controller is configured to, when receiving a write command to which the write ratio of the plurality of the write types is added from the host, write data to the nonvolatile memory by mixing the plurality of the write types at the write ratio.

24. The memory system of claim 22, wherein
the controller is configured, when receiving an inquiry on the memory system from the host, to send performance information of the memory system to the host.

* * * * *